(12) United States Patent
Misawa et al.

(10) Patent No.: US 7,113,220 B1
(45) Date of Patent: Sep. 26, 2006

(54) IMAGE CAPTURING APPARATUS WITH CONVENIENT HANDLING AND OPERATION

(75) Inventors: Takeshi Misawa, Saitama (JP);
Kentaro Tokiwa, Saitama (JP);
Makoto Isozaki, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 809 days.

(21) Appl. No.: 09/702,817

(22) Filed: Nov. 1, 2000

(30) Foreign Application Priority Data

Nov. 1, 1999 (JP) ................................. 11-311495
Nov. 1, 1999 (JP) ................................. 11-311556

(51) Int. Cl.
*H04N 5/225* (2006.01)
(52) U.S. Cl. ....................... 348/376; 348/373
(58) Field of Classification Search ................ 348/373, 348/376; D16/202, 208, 211, 220; 455/575.3, 455/575.4, 556.1
See application file for complete search history.

(56) References Cited

U.S. PATENT DOCUMENTS

| | | | |
|---|---|---|---|
| 6,009,336 A * | 12/1999 | Harris et al. ................ | 455/566 |
| 6,122,526 A * | 9/2000 | Parulski et al. .......... | 455/556.1 |
| 6,229,953 B1 * | 5/2001 | Ejima et al. ................... | 386/96 |
| 6,308,084 B1 * | 10/2001 | Lonka ...................... | 455/556.1 |
| 6,424,843 B1 * | 7/2002 | Reitmaa et al. ............. | 455/566 |
| 2001/0012065 A1 * | 8/2001 | Ejima et al. ................ | 348/232 |

FOREIGN PATENT DOCUMENTS

JP          10-65943          3/1998

* cited by examiner

*Primary Examiner*—David Ometz
*Assistant Examiner*—Kelly L. Jerabek
(74) *Attorney, Agent, or Firm*—Sughrue Mion, PLLC

(57) ABSTRACT

According to the present invention, an image capturing apparatus for capturing a subject includes: a vertical body including a front face and a back opposed to the front face; a grip to be grasped by an operator's hand, the grip including at least a region of the front face and a region of the back; a release switch provided on the front face of the body in a region other than the part included in the grip; a capturing lens provided on the back of the body in a region other than the part included in the grip; an image monitor operable to display the subject, the image monitor being provided above the release switch.

9 Claims, 32 Drawing Sheets

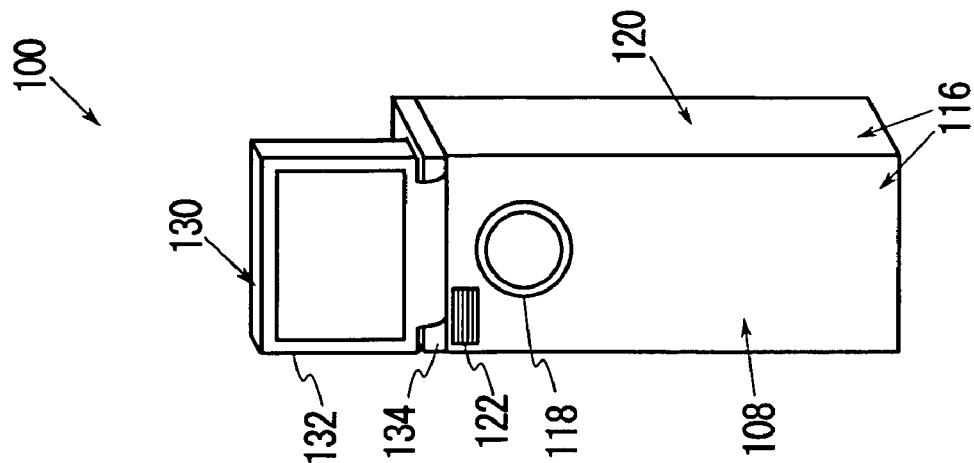
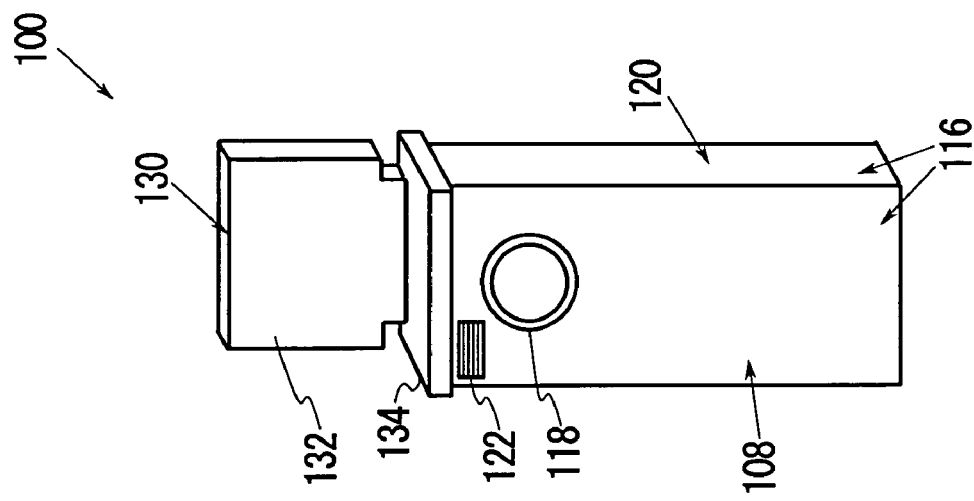
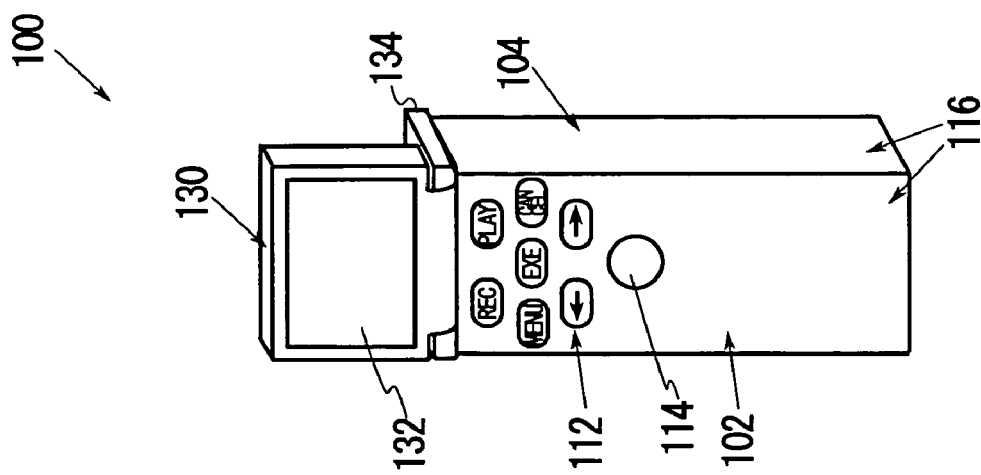

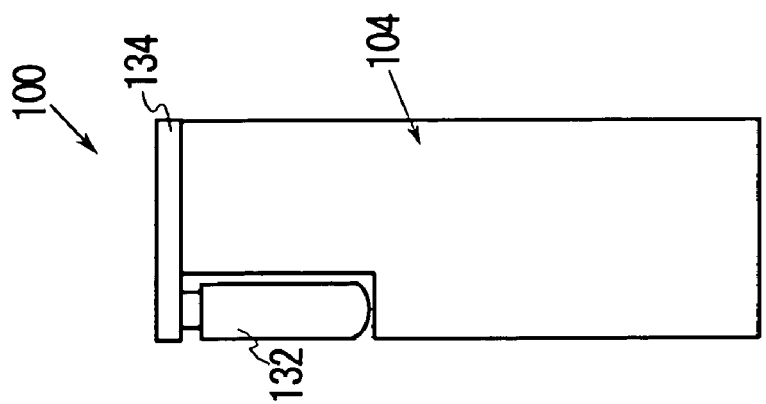
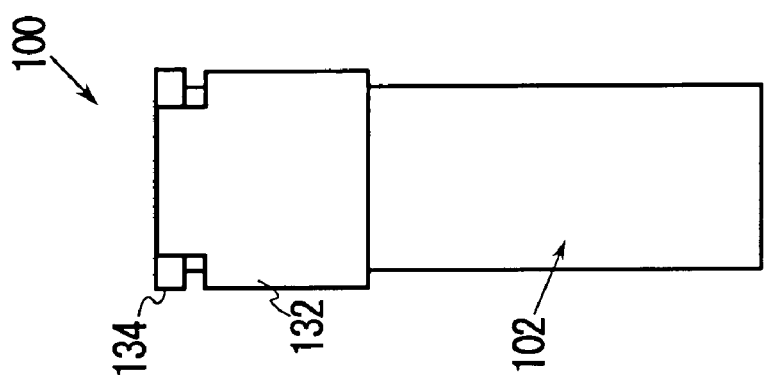
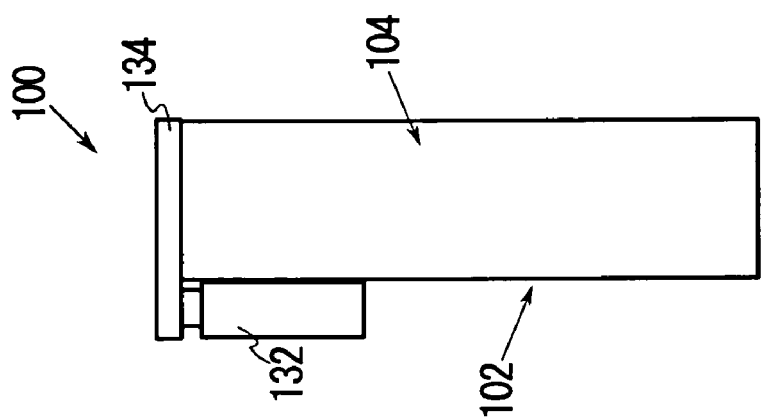
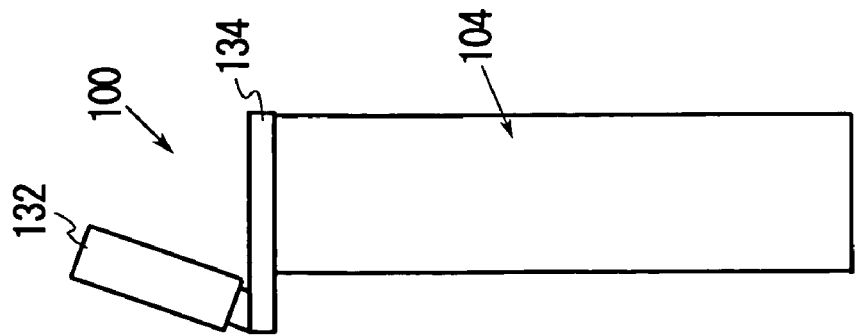

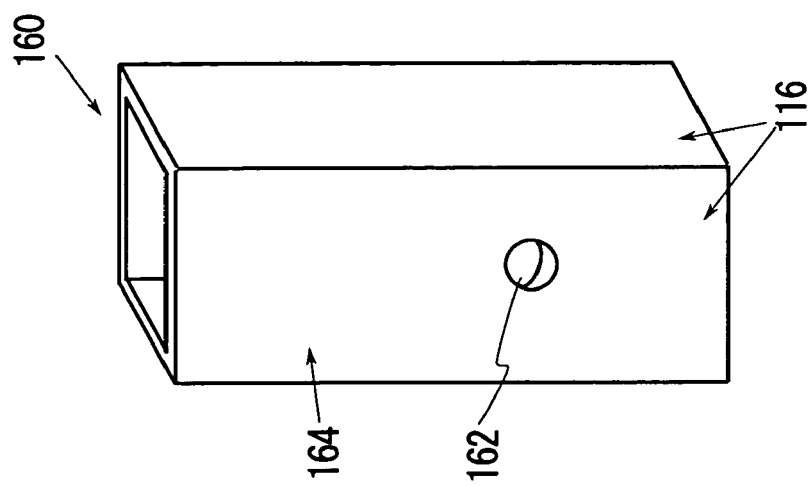
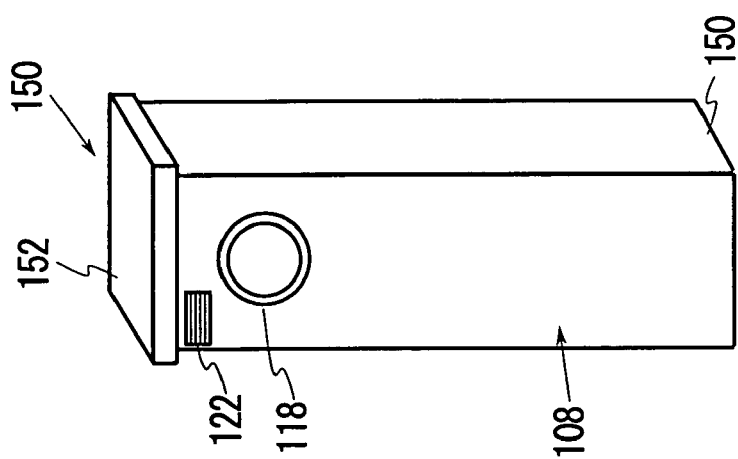
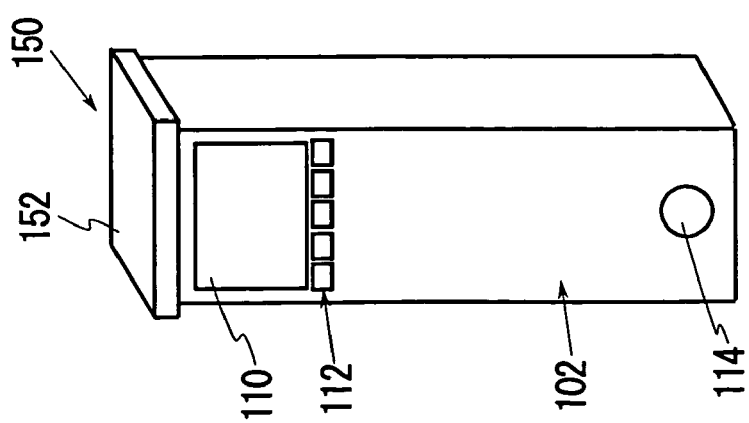
FIG. 7C
FIG. 7B
FIG. 7A

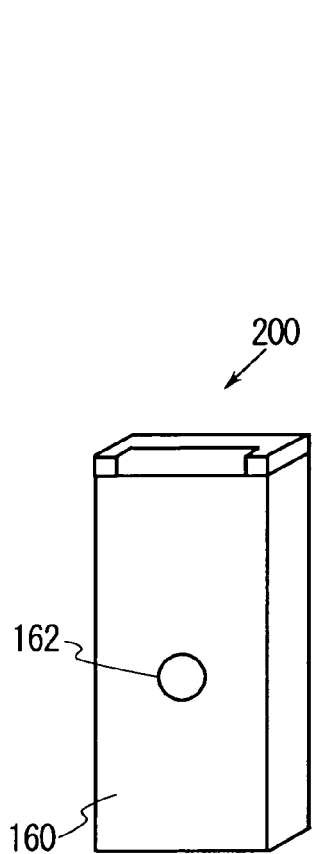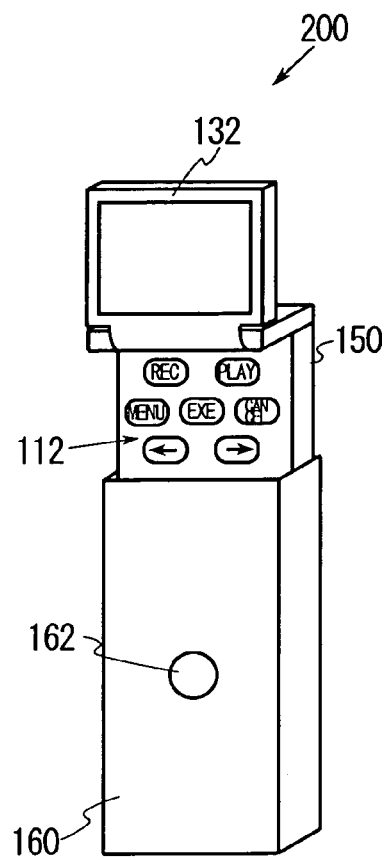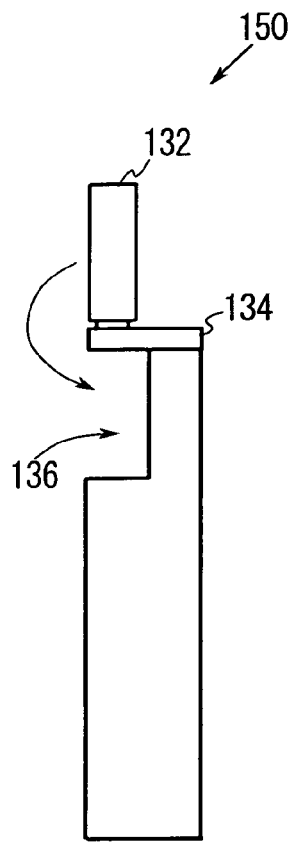
FIG. 13A  FIG. 13B  FIG. 13C
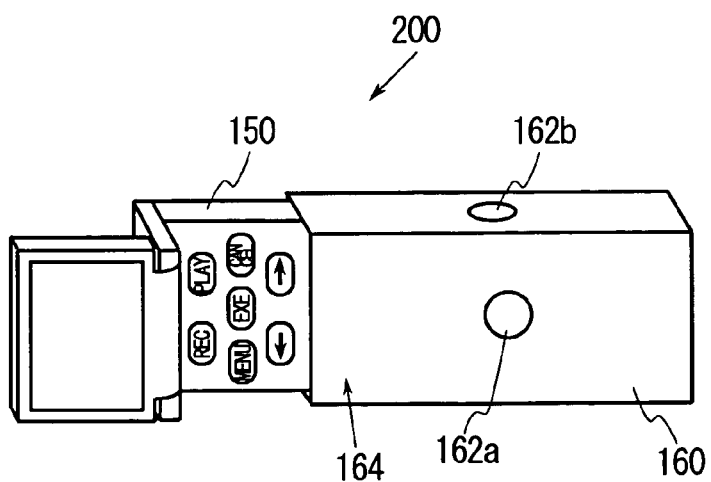
FIG. 14

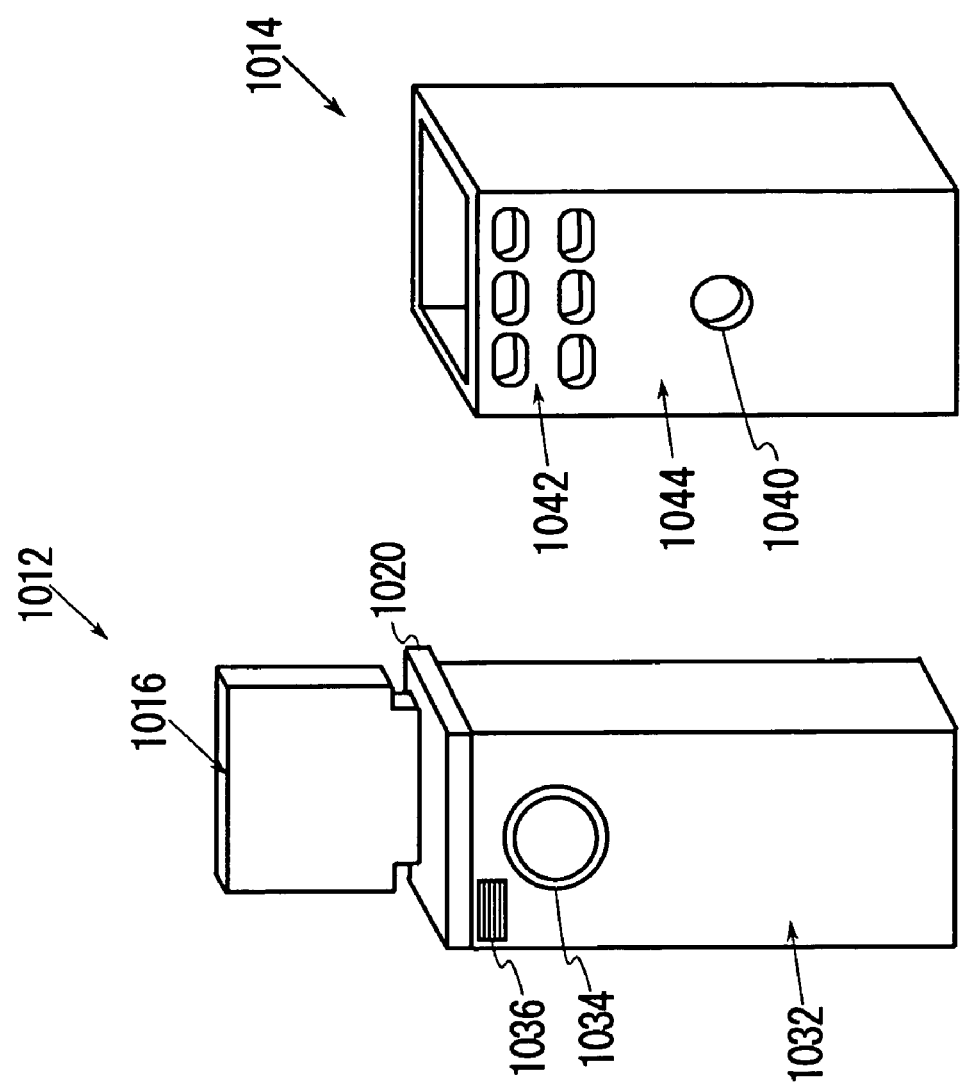
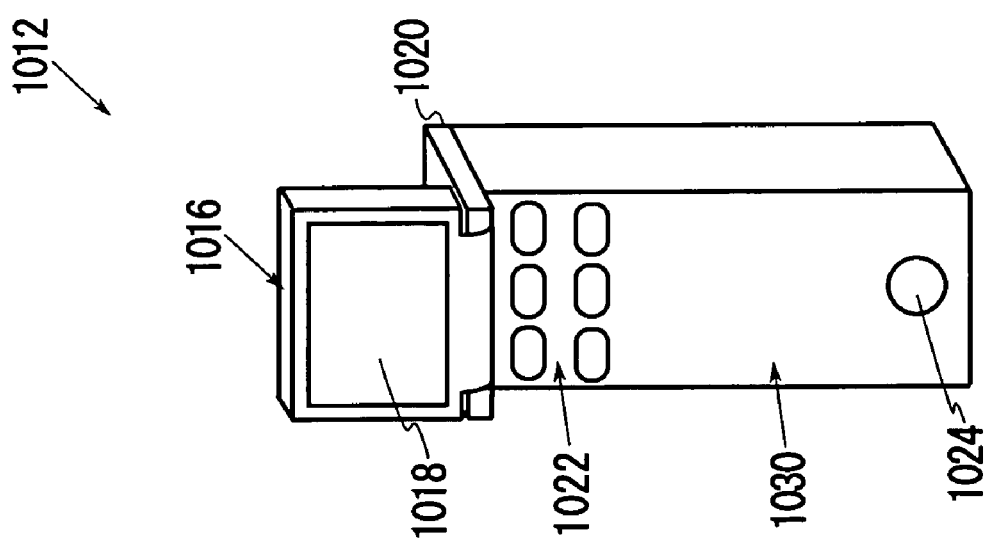
FIG. 21A  FIG. 21B  FIG. 21C

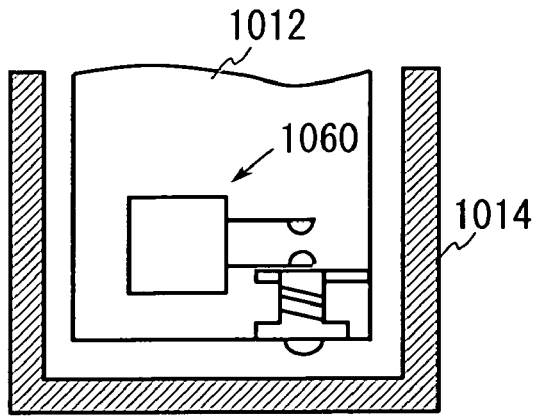 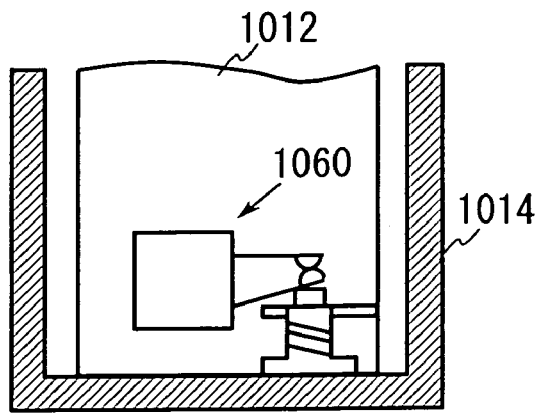
FIG. 28A　　　　　　　　FIG. 28B
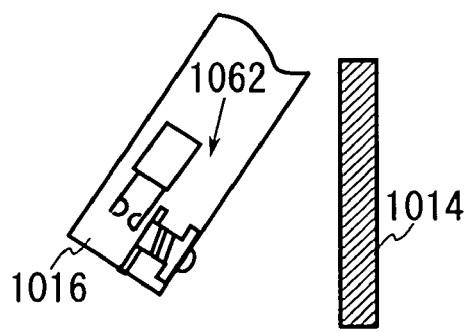 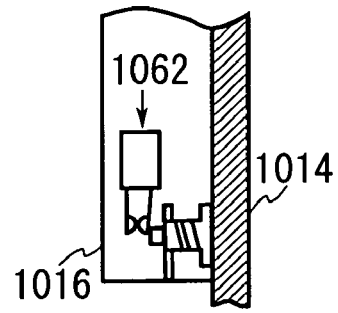
FIG. 29A　　　　　　　　FIG. 29B

IMAGE CAPTURING APPARATUS WITH CONVENIENT HANDLING AND OPERATION

This patent application claims priority based on Japanese patent applications, H11-311495 filed on Nov. 1, 1999 and H11-311556 filed on Nov. 1, 1999, the contents of which are incorporated herein by reference.

BACKGROUND OF THE INVENTION

1. Field of the Invention

The present invention relates to an image capturing apparatus that can take a picture of a subject. More particularly, the present invention relates to an image capturing apparatus of vertical shape that an operator can operate with a single hand.

2. Description of the Related Art

Most of conventional capturing devices such as a digital camera have a horizontal shape. Although there are a lot of vertical digital video cameras, they are designed to be operated by a right-handed person. Thus, it is difficult for a left-handed person to operate such vertical digital cameras.

Moreover, the number of operation switches provided on the image capturing apparatus has been increased as the image capturing apparatus come to have more functions. This makes the operation of the image capturing apparatus complicated, thus causing the operator not to operate the image capturing apparatus easily, and sometimes wrong operations by the operator may happen.

In order to avoid the wrong operations by the operator, a digital camera and a digital video camera have been proposed that includes a cover for covering a part of the structure, for example, an operation panel and an image monitor. Such a cover is also effective for preventing the digital camera or the like from being damaged. Japanese Laid-Open Patent Publication No. 10-65943, for example, discloses a video camera having a slidable cover for covering some of the operation switches. However, the slidable cover does not cover all the operation switches provided with the video camera. Therefore, there still remains the possibility that a certain operation button or switch may be depressed erroneously while the digital camera or the video camera is not in use and, in the worst case, the digital camera or the video camera may be damaged.

SUMMARY OF THE INVENTION

Therefore, it is an object of the present invention to provide an image capturing apparatus that can be easily operated both by a right-handed operator and a left-handed operator. It is another object of the present invention to provide an image capturing apparatus having a reduced number of operation switches in order to make the operation of the image capturing apparatus easier. It is still another object of the present invention to provide an image capturing apparatus with a case into which a camera body can be accommodated. It is still another object of the present invention to provide an image capturing apparatus with a case into which a camera body can be accommodated and parts of the capturing device can be locked while the camera body is in the case. These objects are achieved by combinations described in the independent claims. The dependent claims define further advantageous and exemplary combinations of the present invention.

According to the first aspect of the present invention, an image capturing apparatus for capturing a subject is provided. The image capturing apparatus includes: a vertical body including a front face and a back opposed to the front face; a grip to be grasped by an operator's hand, the grip including at least a region of the front face and a region of the back; a release switch provided on the front face of the body in a region other than the part included in the grip; a capturing lens provided on the back of the body in a region other than the part included in the grip; an image monitor operable to display the subject, the image monitor being provided above the release switch.

In an embodiment of the present invention, the release switch is provided on the front face substantially at a center in a direction perpendicular to a longitudinal direction of the body.

In another embodiment of the present invention, the image monitor is provided on substantially the same plane as a plane on which the release switch is provided.

In still another embodiment of the present invention, the image monitor is attached to an upper portion of the body around an axis along a longitudinal direction of the body.

According to the second aspect of the present invention, an image capturing apparatus for capturing a subject is provided. The image capturing apparatus includes: a vertical camera body having a front face and a back opposed to the front face; and a case, having a front face and a back opposed to the front face, capable of covering the camera body, the cover being movable only in one direction with respect to the camera body, wherein the camera body includes a first release switch provided on the front face, a capturing lens provided on the back face and an image monitor provided above the first release switch, and the case includes a grip to be grasped by an operator's hand and a first opening operable to allow the operator to press the first release switch, the grip including at least a region of the front face and a region of the back of the case, the first opening being provided in a region other than the region included in the grip.

In an embodiment of the present invention, the first release switch is provided on the front face substantially at a center in a direction perpendicular to a longitudinal direction of the camera body.

In another embodiment of the present invention, the image monitor is provided on substantially the same plane as a plane on which the first release switch is provided.

In still another embodiment of the present invention, the image monitor is attached to an upper portion of the body around an axis along a longitudinal direction of the camera body.

In still another embodiment of the present invention, when the camera body is at a first position with respect to the case, the first release switch and the capturing lens are covered by the case, and when the camera body is at a second position with respect to the case, the first release switch is placed in a state allowing the first release switch to be pressed and the capturing lens appears outside of the case.

In still another embodiment of the present invention, the image monitor is covered by the case when the camera body is at the first position with respect to the case, whereas the image monitor appears outside the case when the camera body is at the second position.with respect to the case.

In still another embodiment of the present invention, the image monitor is provided rotatably around an axis along a direction of a movement of the case with respect to the camera body.

In still another embodiment of the present invention, the image monitor is attached to an end of the camera body by a support that is rotatable around the axis along the direction of the movement of the case with respect to the camera body.

In still another embodiment of the present invention, the image monitor is supported so as to adjust an angle between the image monitor and the support.

In still another embodiment of the present invention, the camera body includes a second release switch provided on a different face of the camera body from the face on which the first release switch is provided, and the case includes a second opening operable to allow the second release switch to be pressed, the second opening being provided in a region other than the region included in the grip.

In still another embodiment of the present invention, the camera body includes a tilt sensor operable to detect a tilt of the camera body with respect to a horizontal direction to output a tilt signal indicative of the detected tilt, and at least one of the first release switch and the second release switch is switched between an operative state and an inoperative state based on the tilt signal.

In still another embodiment of the present invention, the camera body includes at least one terminal to be electrically connected to an external device, and the case includes at least one terminal-opening at a position corresponding to the at least one terminal of the camera body.

In still another embodiment of the present invention, the camera body includes an operation switch and a case includes a switch-opening, and the operation switch appears through the switch-opening when the camera body is at the second position while the operation switch does not appear when the camera body is at the first position.

In still another embodiment of the present invention, the switch-opening is provided with a switch cover having an indication of a function of the operation switch usable in one of operation modes of the image capturing apparatus, and the operation switch has another indication of a function of the operation switch usable in another operation mode of the image capturing apparatus.

In still another embodiment of the present invention, a region of the front face of the camera body other than a region having the first release switch, which appears through the first opening of the case when the camera body is at the first position, has a different color from the first release switch.

In still another embodiment of the present invention, the image capturing apparatus further includes a first lock mechanism image monitor to a predetermined position to prevent the image monitor from rotating in a such direction that the image monitor comes apart from the case when the camera body is at the first position with respect to the case.

In still another embodiment of the present invention, the image capturing apparatus further includes a first lock-release mechanism operable to release the lock of the image monitor by the first lock mechanism when the camera body is drawn from the case.

In still another embodiment of the present invention, the first lock mechanism is provided to the camera body and the first lock-release mechanism is provided to the case.

In still another embodiment of the present invention, the image capturing apparatus further includes a second lock mechanism operable to lock the camera body to the first position with respect to the case to prevent the camera body from being drawn from the case, when the camera body is at the first position.

In still another embodiment of the present invention, the image capturing apparatus further includes a second lock-release mechanism operable to release the lock of the camera body by the second lock-release mechanism for enabling the camera body to be drawn from the case.

In still another embodiment of the present invention, the image capturing apparatus further includes a rotation mechanism operable to make the image monitor rotate in a such direction that the image monitor comes apart from the case, when the camera body is drawn from the case.

In still another embodiment of the present invention, the rotation mechanism includes a forcing means operable to force the image monitor to come apart from the case.

In still another embodiment of the present invention, the rotation mechanism includes a motor operable to make the image monitor rotate in the direction such that the image monitor comes apart from the case.

In still another embodiment of the present invention, the image capturing apparatus further includes: a first lock mechanism operable to lock the image monitor to a predetermined position to prevent the image monitor from rotating in a such direction that the image monitor comes apart from the case when the camera body is at the first position with respect to the case; and a second lock mechanism operable to lock the camera body to the first position with respect to the case to prevent the camera body being drawn from the case when the camera body is at the first position, wherein the camera body includes: a first detector operable to detect whether or not the image monitor is locked to the predetermined position; and a second detector operable to detect whether or not the camera body is at the first position of the case.

In still another embodiment of the present invention, the image capturing apparatus has at least one operation mode including a playback mode that is selected when the first detector detects that the image monitor unit is not locked to the predetermined position while the second detector detects that the camera body is at the first position with respect to the case.

In still another embodiment of the present invention, the image capturing apparatus has at least one operation mode including a shooting mode, the shooting mode being selected when the first detector detects that the image monitor unit is not locked at the predetermined position while the second detector detects that the camera body is not accommodated at the first position.

This summary of the invention does not necessarily describe all necessary features so that the invention may also be a sub-combination of these described features.

BRIEF DESCRIPTION OF THE DRAWINGS

While the specification concludes with claims particularly pointing out and distinctly claiming the subject matter which is regarded as the invention, it is believed that the invention, the object, features and advantages thereof will be better understood from the following description taken in connection with the accompanying drawings in which:

FIGS. 3A, 3B and 3C show a modified example of the image capturing apparatus 100 shown in FIGS. 1A and 1B;

FIGS. 4A, 4B, 4C and 4D is side views and a front view of the image capturing apparatus 100 when an angle between an image monitor 132 and a support 134 is changed;

FIGS. 7A, 7B and 7C are perspective views of a camera body 150 and a case 160 constituting the image capturing apparatus 200 according to the second embodiment of the present invention;

FIGS. 13A, 13B and 13C show another modified example of the image capturing apparatus 200 in which the image monitor 132 can be accommodated in the case 160;

FIG. 14 shows still another modified example of the image capturing apparatus 200 in which a plurality of openings are provided;

FIGS. 21A, 21B and 21C are perspective views of a camera body 1012 and a case 1014 constituting the image capturing apparatus 1000;

FIGS. 28A and 28B show an example of a detector 1060 for detecting whether or not the camera body 1012 is accommodated at the first position (accommodation position) of the case 1014;

FIGS. 29A and 29B show an example of a detector 1062 for detecting whether or not an image monitor unit 1016 is fixed to a predetermined position;

DETAILED DESCRIPTION OF THE PREFERRED EMBODIMENTS

The invention will now be described based on preferred embodiments, which do not intend to limit the scope of the present invention, but rather to exemplify the invention. All of the features and the combinations thereof described in the embodiments are not necessarily essential to the invention.

Embodiment 1

Figure 1A:
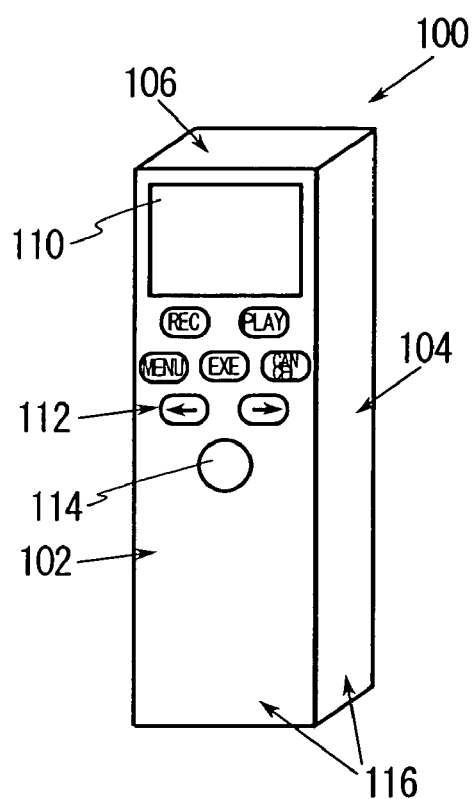
FIGS. 1A and 1B show an image capturing apparatus 100 for capturing an image of a subject according to the first embodiment of the present invention.
Figure 1B:
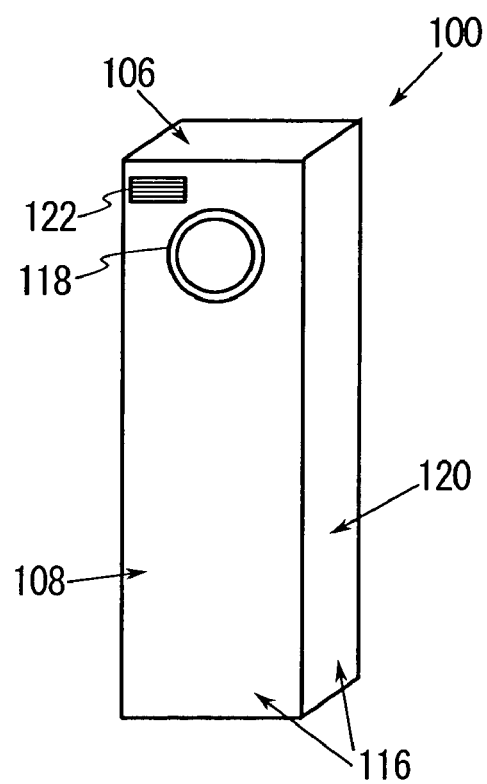

FIGS. 1A and 1B show an image capturing apparatus 100 that can capture an image of a subject according to the first embodiment of the present invention. More specifically, FIG. 1A is a perspective view showing a front face 102, a right side face 104 and an upper face 106 of the image capturing apparatus 100 of the present embodiment.

The image capturing apparatus 100 includes an image monitor 110, a plurality of operation switches 112 and a release switch 114 on the front face 102, as shown in FIG. 1A. The release switch 114 is located at substantially the center in the longitudinal direction of the vertical body, and the operation switches are located within an upper area than the release switch. A part of each of the front face 102, the right side face 104, a left side face and a back of the image capturing apparatus 100 serves as a grip to be grasped by an operator. The operation switches 112 include various kinds of switches required for operating the image capturing apparatus 100, for example, a record switch (REC), a playback switch (PLAY) or the like. The release switch 114 is a shutter button to be pressed by the operator of the image capturing apparatus 100. In the present embodiment, one of main features of the image capturing apparatus is to have a vertical shape or an upright posture that enables the operator to operate the image capturing apparatus 100 with his/her single hand, as shown in FIG. 1A.

The image monitor 110 can display the subject to be taken. Thus, the operator can take a picture of the subject by pressing the release switch 114 while viewing the subject displayed on the image monitor 110. It is preferable that the image monitor 110 be provided on substantially the same plane as the front face 102 on which the release switch 114 is provided. In the present embodiment, the image monitor 110 is provided on the same plane as the release switch 114, as shown in FIG. 1A. Alternatively, the image monitor 110 may be provided so as to be at a certain angle with respect to the front face 102 on which the release switch 114 is provided.

The grip 116 is one part of the image capturing apparatus 100 that is to be grasped by a hand of the operator. In the arrangement of FIG. 1A, the grip 116 is composed of portions of a body of the image capturing apparatus 100 where no release switch 114 or no operation switch 112 is provided. In other words, the grip 116 corresponds to a portion enabling the operator to naturally hold the image capturing apparatus 100 by his/her hand when the operator wants to capture the image of the subject, and may be composed of all the portions having no operation component such as the release switch 114.

The release switch 114 is provided on the front face 102 in a region other than the region serving as the grip 106. It is preferable that the release switch 114 may be provided substantially at the center in a direction perpendicular to a longitudinal direction of the image capturing apparatus 100. Thus, in the arrangement shown in FIG. 1A, it is preferable to arrange the release switch 114 at the center in a lateral direction of the image capturing apparatus 100. Such an arrangement of the release switch 114 allows the operator to press the release switch 114 either by the right hand or by the left hand without causing the operator to feel any inconvenience. Furthermore, it is preferable to arrange the release switch 114 at such a position that the operator can push the release switch 114 with a thumb while grasping the image capturing apparatus 100 by his/her hand.

FIG. 1B is a perspective view of the image capturing apparatus 100, and shows the back 108, the left side face 120 and the upper face 106 of the image capturing apparatus 100. The image capturing apparatus 100 includes a capturing lens 118 and a flash mechanism 122 on the back 108. A part of the body of the image capturing apparatus 100 where no operation component such as the capturing lens 118 is arranged serves as a part of the grip 116 that is to be grasped by the operator.

The capturing lens 118 is arranged on the back 108 in a region other than the region serving as the grip 116. When the subject is shot, an image signal obtained via the capturing lens 118 is processed within the image capturing apparatus 100 so as to be displayed on the image monitor 110. The flash mechanism 122 can be used to provide additional light in a low-light condition.

Figure 2:
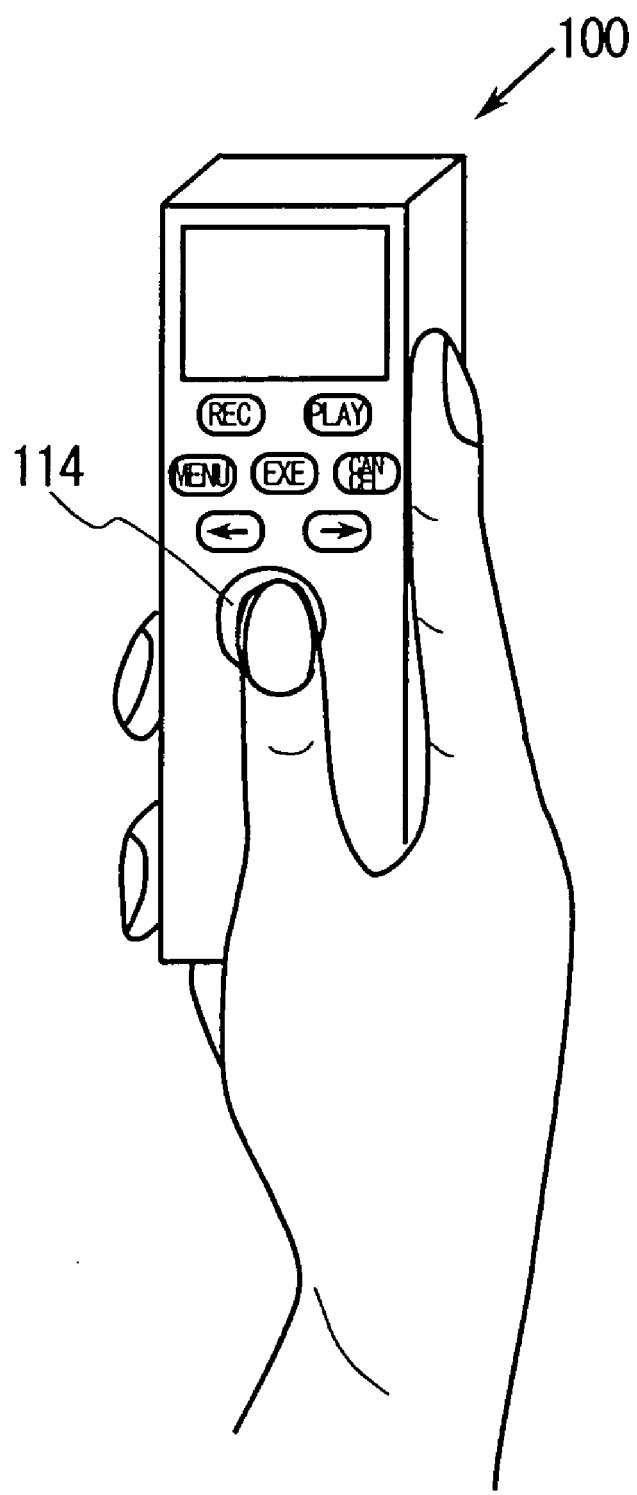
FIG. 2 shows a state where the image capturing apparatus 100 is grasped by an operator when capturing the image.

FIG. 2 illustrates a state where the operator grasps the image capturing apparatus 100 in order to capture the image of the subject. In this state, the operator can push the release switch 114 by his/her thumb. Although the manner of grasping the image capturing apparatus 100 is not limited to that shown in FIG. 2, it is preferable that the release switch 114 be arranged at such a position that the operator can easily push it by his/her thumb.

FIGS. 3A, 3B and 3C show a modified example of the image capturing apparatus 100 shown in FIGS. 1A and 1B. Please note that components labeled with the same reference numerals as those in FIGS. 1A and 1B can have the same or similar functions and operate in the same or similar ways as/to the corresponding components in FIGS. 1A and 1B.

FIG. 3A is a perspective view of the image capturing apparatus 100 in the present example, showing the front face 102. The image capturing apparatus 100 includes the operation switches 112, the release switch 114, the grip 116 and an image display device 130. In other words, the image capturing apparatus 100 shown in FIGS. 3A to 3C includes the image display device 130 attached to the upper face of the image capturing apparatus 100 in place of the image monitor 110 shown in FIGS. 1A and 1B.

The image display device 130 includes an image monitor 132 and a support 134. The support 134 is attached to an upper edge, i.e., the upper face of the image capturing apparatus 100 in such a manner the support 134 can rotate around an axis along the longitudinal direction of the image capturing apparatus 100. The support 134 supports the image monitor 132. It is preferable that the support 134 rotatably supports the image monitor 132 at an end of the support 134 so as to vary an angle between the support 134 and the image monitor 132. In this case, the operator can adjust the angle between the image monitor 132 and the support 134, thereby allowing the operator to view the image monitor 132 comfortably.

FIG. 3B is a perspective view showing the back 108 of the image capturing apparatus 100 in this modified example. As shown in FIG. 3B, a screen of the image monitor 132 faces towards the same direction as the release switch 114 does. Thus, at the state shown in FIG. 3B, the operator cannot view the screen of the image monitor 132 from the side of the capturing lens 118.

FIG. 3C is a perspective view showing the back face 108 of the image capturing apparatus 100 but shows a different state from the state shown in FIG. 3B. At the state shown in FIG. 3C, the support 134 is rotated by 180 degrees from the position shown in FIG. 3B, so that the screen of the image monitor 132 faces towards the same direction as the capturing lens 118. Thus, the operator can capture his/her image while checking how his/her image is captured in a mode of self-capturing.

FIGS. 4A, 4B, 4C and 4D show various states of the image capturing apparatus 100 where the angle between the image monitor 132 and the support 134 is varied.

FIG. 4A is a side view of the image capturing apparatus 100 and shows the state where the image monitor 132 is tilted against the upper face of the support 134. In a case where the operator needs to hold the image capturing apparatus 100 at a level lower than the operator's eyes, for example, the operator can view the screen of the image monitor 132 without squatting down, by tilting the image monitor 132 so that the screen faces upwardly.

FIG. 4B is a side view of the image capturing apparatus 100 showing the state where the image monitor 132 is folded over the front face 102 of the image capturing apparatus 100 so that the image monitor 132 is overlaid on the front face 102. It is preferable to protect a panel of the image monitor 132 by folding it over the front face 102 of the image capturing apparatus 100 when the image capturing apparatus 100 is not in use. Thus, the panel of the image monitor 132 can be prevented from being damaged.

In addition, when the image monitor 132 is overlaid on the front face 102 as shown in FIG. 4B, it is preferable to make the switching functions of the release switch 114 and the operation switches 112 inoperative. In order to realize this, for example, the image capturing apparatus 100 may include an angle sensor for detecting the angle between the image monitor 132 and the support 134. In this case, it is preferable, when the angle between the image monitor 132 and the support 134 detected by the angle sensor reaches a predetermined angle, a controller (not shown) of the image capturing apparatus 100 turns off the switching functions of the switches 112 and 114 to make the switches 112 and 114 inoperative. For example, the functions of the switches 112 and 114 may be made inoperative when the image monitor 132 and the support 134 are on the same line, that is, the angle between them reaches 180 degrees.

FIG. 4C is a front view of the image capturing apparatus 100 showing the same state as FIG. 4B. The operation switches 112 and the release switch 114 provided on the front face 102 are covered by an outer cover of the image monitor 132, as shown in FIG. 4C. Therefore, the release switch 114 and the operation switches 112 cannot be pressed when the image capturing apparatus 100 is not in use. Moreover, the panel of the image monitor 132, that is an LCD typically, can be protected.

FIG. 4D is a side view of the image capturing apparatus 100 showing another state where the image monitor 132 is folded over the front face 102 to be overlaid thereon. In the example shown in FIG. 4D, the image capturing apparatus 100 is formed with a recessed part on the front face for accommodating the image monitor 132. In this case, it is preferable that the operation switches 112 and the release switch 114 be provided in a region of the front face where the recessed part is provided so that they cannot be exposed when the image monitor 132 is accommodated in the notch, as shown in FIG. 4D. In the case where the notch is provided on the front face of the image capturing apparatus 100, it is possible to eliminate a step between the body of the image capturing apparatus 100 and the image monitor 132 generated when the image monitor 132 is folded, as shown in FIG. 4B.

Figure 5C:
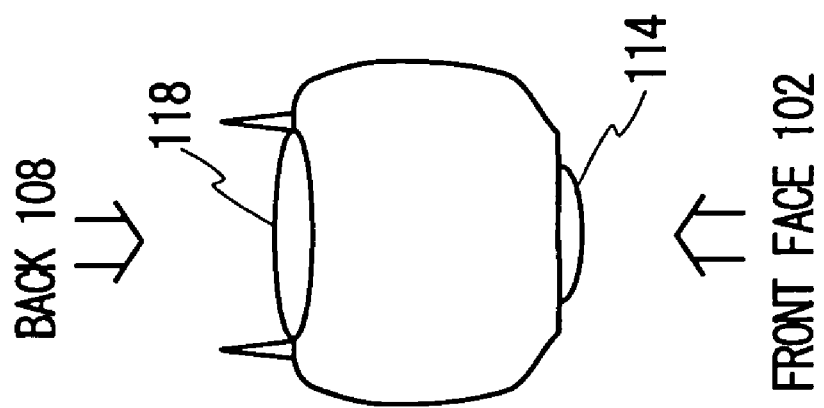
FIGS. 5A, 5B and 5C are cross-sectional views of capturing apparatuses having carious shapes.
Figure 5B:
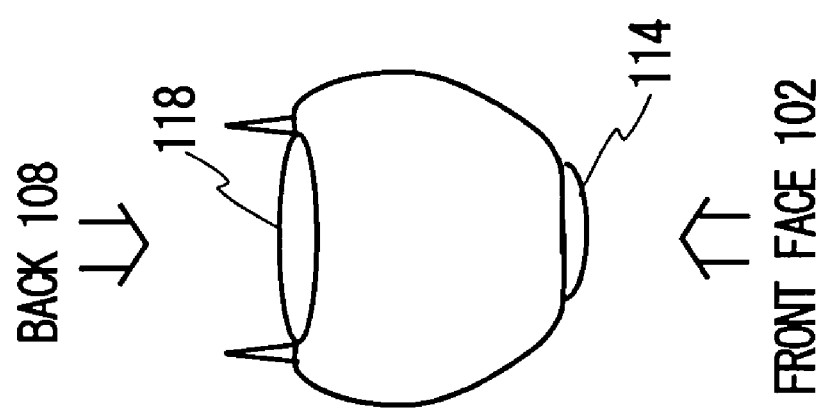
Figure 5A:
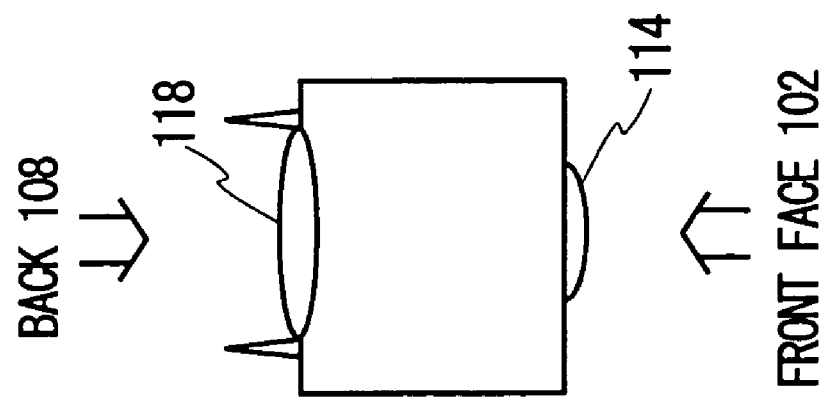

FIGS. 5A, 5B and 5C are cross-sectional views of the image capturing apparatus 100 in cases where the image capturing apparatus 100 has various shapes. FIG. 5A shows a cross section of the image capturing apparatus 100 having a rectangular shape as shown in FIG. 1A to FIG. 4D. However, the cross-sectional shape of the image capturing apparatus 100 is not limited to the rectangular shape. The image capturing apparatus 100 may have the cross-sectional shape shown in FIG. 5B or 5C, for example. In the cross section of the image capturing apparatus 100, a face opposite to the front face is defined as a back. In addition, in FIGS. 5A, 5B and 5C, the release switch 114 is shown as being formed on the outer surface of the body of the image capturing apparatus 100. However, in another arrangement, the release switch 114 may be provided inside the body in such a manner that the release switch 114 can be pushed from the outside of the body through an opening or the like.

Embodiment 2

Figure 6C:
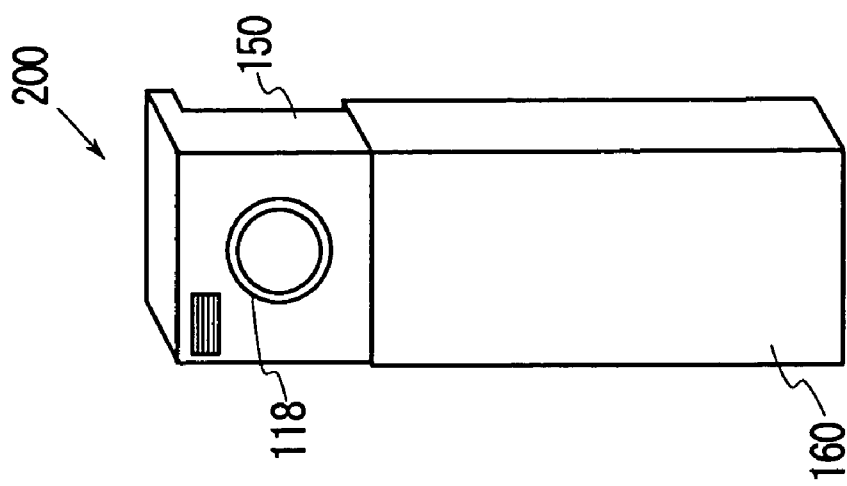
FIGS. 6A, 6B and 6C show an image capturing apparatus 200 for capturing the image of the subject according to the second embodiment of the present invention.
Figure 6B:
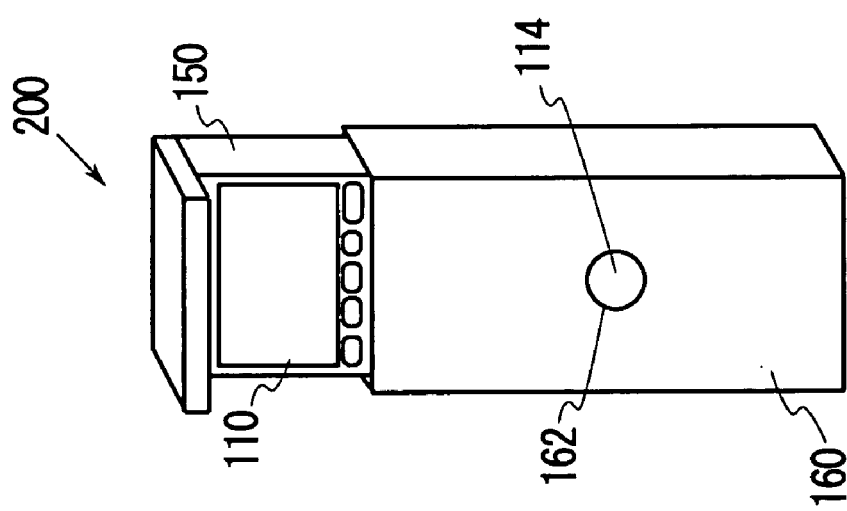
Figure 6A:
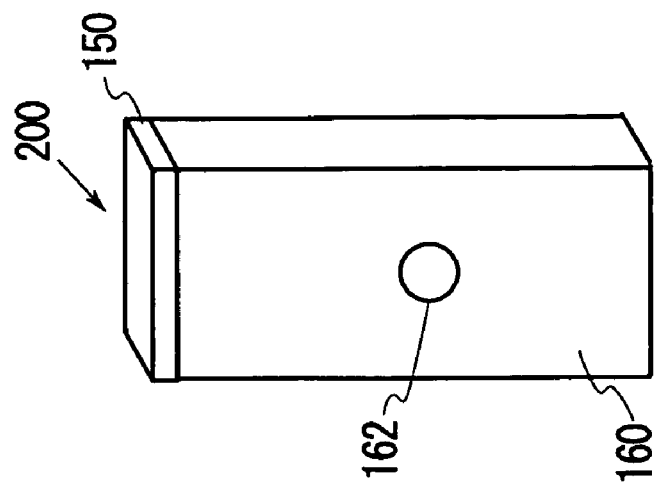

FIGS. 6A, 6B and 6C show an image capturing apparatus 200 for capturing an image of a subject according to the second embodiment of the present invention. The image capturing apparatus 200 includes a camera body 150 and a case 160. The camera body 150 has the same or a similar structure as/to that of the image capturing apparatus 100 of the first embodiment and therefore operate in the same or a similar manner as/to the image capturing apparatus 100. In the image capturing apparatus 200 of the second embodiment, the case 160 can cover the camera body 150 so that the case 160 can move only in one direction with respect to the camera body 150. One of main features of the image capturing apparatus 200 of the second embodiment is to have a vertical shape or an upright posture so as to enable the operation by a single hand of operator.

FIG. 6A is a perspective view of the image capturing apparatus 200 showing a state where the camera body 150 is accommodated in the case 160. The case 160 has an opening 162 for exposing the release switch 114 provided on the camera body to the outside of the case 160. On the other hand, FIG. 6B is a perspective view of the image capturing apparatus 200 showing the camera body 150 drawn out from the case 160 so as to place the image capturing apparatus 200 in a shooting mode. FIG. 6C is a perspective view of the image capturing apparatus 200 showing the back thereof when the camera body 150 is drawn out from the case 160 and is therefore in the shooting mode.

In this specification, the state where the camera body 150 is accommodated in the case 160, as shown in FIG. 6A, is defined that the camera body 150 is at a first position with respect to the case 160, while the state where the camera body 150 is drawn out from the case 160, as shown in FIG. 6B, is defined that the camera body 150 is at a second position with respect to the case 160.

When the camera body 150 is at the first position with respect to the case 160, the release switch 114 is covered by the case 160 so as to prevent the operator from pushing the release switch 114 through the opening 162. Also, the capturing lens 118 and the image monitor 110 are covered by the case 160 at this state. On the other hand, when the camera body 150 is at the second position with respect to the case 160, the release switch 114 is put in a place where the operator can push the release switch 114 through the opening 162, and the capturing lens 118 and the image monitor 110 are exposed to the outside of the case 160, as shown in FIGS. 6B and 6C.

When the camera body 150 is accommodated in the case 160, as shown in FIG. 6A, the operation switches and the release switch cannot appear. Thus, at this state, wrong operation caused when the operator pushes the switches by mistake can be prevented and the risk that the switches 112 and 114, the image monitor 110 and the like are damaged can be reduced. Therefore, according to the present embodiment, it is possible to keep the image capturing apparatus 200 safely only by accommodating the camera body 150 in the case 160 without using a special cover.

FIGS. 7A, 7B and 7C are perspective views of the image capturing apparatus 200 composed of the camera body 150 and the case 160 according to the second embodiment of the present invention.

FIG. 7A shows the front face 102 of the camera body 150 in the present embodiment. The camera body 150 includes the image monitor 110, the operation switches 112, and the release switch 114 on the front face 102. The operation switches 112 may include various switches required for operating the image capturing apparatus 200, such as a record switch (REC) or a playback switch (PLAY). In addition, the camera body 150 includes a lid 152 on the upper face.

The image monitor 110 can display the subject. In the arrangement shown in FIG. 7A, the image monitor 110 is provided on substantially the same plane as the release switch 114. Alternatively, the image monitor 110 may be provided to form a certain angle with respect to the plane on which the release switch 114 is provided in order for the operator to comfortably view the displayed image on the image monitor 110. It is preferable to arrange the release switch 114 on the front face 102 substantially at the center in the direction perpendicular to the longitudinal direction of the camera body 150.

FIG. 7B shows the back 108 of the camera body 150 in the present embodiment. The camera body 150 includes the capturing lens 118 and the flash mechanism 122 on the back 108.

FIG. 7C shows a front face 164 of the case 160 in the present embodiment. The case 160 has the opening 162 on the front face 164 to allow the operator to push the release switch 114 therethrough. The opening 162 can expose the release switch 114 to the outside of the case 160. The case 160 has the grip 116 constituted by parts of the front face, the back and the side faces. The opening 162 is provided in a region of the front face 164 other than the region serving as the grip 116.

The grip 116 is a portion of the case 160 that is to be grasped by the operator's hand. In the arrangement shown in FIG. 7C, the grip 116 may be defined as all the areas of the case body except for the area having the opening 162. Alternatively, as for the front face 164, the area below the opening 162 may be defined as the part serving as the grip 116.

Figure 8A:
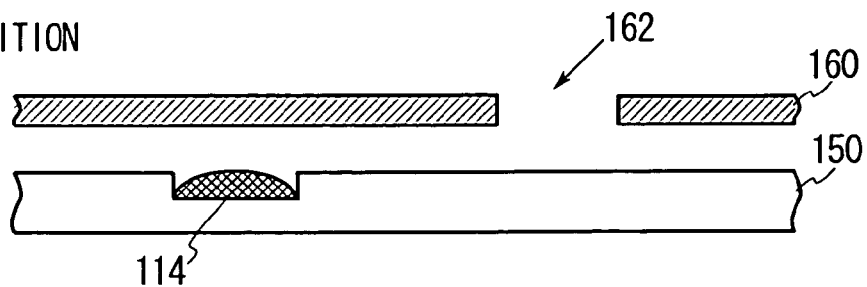
FIGS. 8A and 8B are diagrams showing a positional relationship between a release switch 114 of the camera body 150 and an opening 162 of the case 160.
Figure 8B:
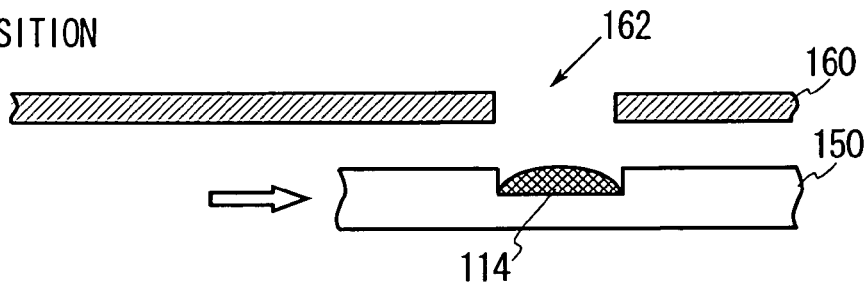

FIGS. 8A and 8B are diagrams showing a positional relationship between the release switch 114 of the camera body 150 and the opening 162 of the case 160.

FIG. 8A shows the positional relationship between the release switch 114 and the opening 162 when the camera body 150 is at the first position with respect to the case 160. At this state, since the position of the release switch 114 is not coincident with the position of the opening 162, the release switch 114 is not exposed to the outside of the case 160. Thus, the operator cannot push the release switch 114. As described above, the release switch 114 can be prevented from being pushed by mistake only by accommodating the camera body 150 in the case 160 at the first position when the image capturing apparatus 200 is not in use.

FIG. 8B shows the positional relationship between the release switch 114 and the opening 162 when the camera body 150 is at the second position with respect to the case 160. At this state, the positions of the release switch 114 and the opening 162 are coincident with each other. Thus, the release switch 114 is exposed to the outside of the case 160 thereby allowing the operator to push the release switch 114.

Figure 9A:
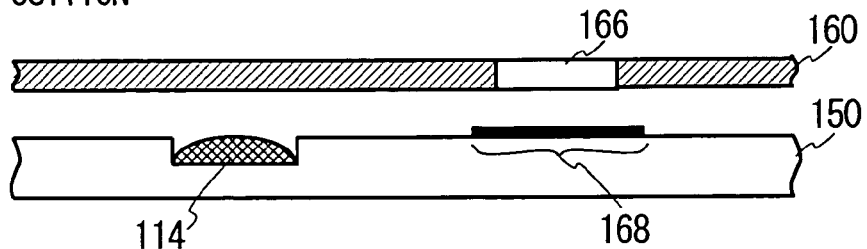
FIGS. 9A and 9B are diagrams showing a positional relationship between the release switch 114 of the camera body 150 and a switch cover of the case 160.
Figure 9B:
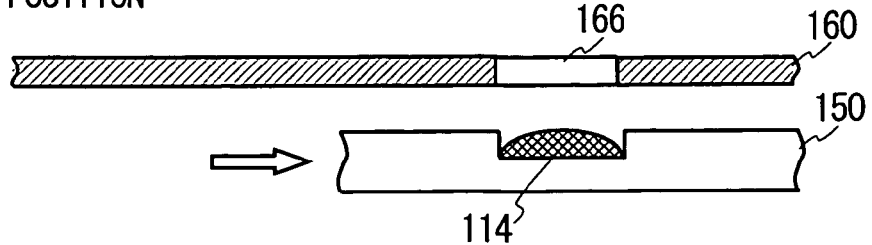

FIGS. 9A and 9B show a positional relationship between the release switch 114 provided on the camera body 150 and a switch cover 166 provided on the case 160. It is preferable to form the switch cover 166 from an elastic material so as to cover the opening 162. By providing the switch cover 166 in the opening 162, it is possible to prevent dust from entering into a space between the camera body 150 and the case 160. The operator can press the release switch 114 via the switch cover 166.

When the camera body 150 is at the first position with respect to the case 160, as shown in FIG. 9A, the release switch 114 cannot be pushed. Therefore, in order to notify the operator that the release switch 114 cannot be pushed, a region 168 of the camera body 150 may be painted in a color different from a color of the release switch 114. In this case, the operator can find that the release switch 114 is inoperative by viewing the color of the region 168 of the camera body 150 that is positioned under the opening 162 or the switch cover 166. For example, the region 168 may be painted in a noticeable color, such as black. Alternatively, the region 168 may be painted in a different color from those of the release switch 114 and the case 160.

On the other hand, when the camera body 150 is at the second position with respect to the case 160, as shown in FIG. 9B, it is preferable that the release switch 114 painted in the different color from the region 168 can be perceived by the operator through the opening 162.

Figure 10A:
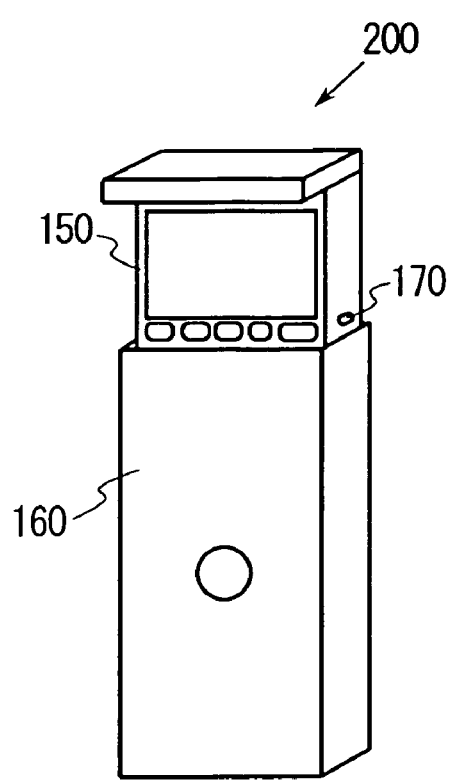
FIGS. 10A and 10B show an example of a case-lock mechanism that can limit the movement of the case 160 with respect to the camera body 150.
Figure 10B:
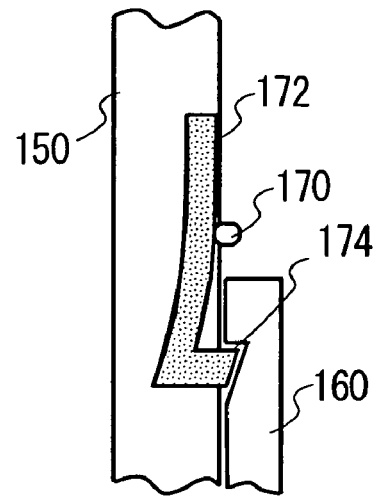

FIGS. 10A and 10B show an example of a case-lock mechanism that can restrict the movement of the case 160 with respect to the camera body 150. Since a battery-exchange lid (not shown) is provided to the camera body 150, the battery may slip out when the operator draws the camera body 150 from the case 160 by mistake while the image capturing apparatus 200 is in use. Therefore, according to the present embodiment, the image capturing apparatus 200 includes the case-lock mechanism that can lock the movements of the camera body 150 and the case 160 at a predetermined position.

FIG. 10A shows the image capturing apparatus 200 having a case-lock switch 170. The case-lock switch 170 is provided on the camera body 150. In the case of the image capturing apparatus 200 having the arrangement shown in FIG. 10A, the operator cannot draw the camera body 150 from the case 160 without pushing the case-lock switch 170.

FIG. 10B shows a configuration of the case-lock mechanism when the camera body 150 is at the first position with respect to the case 160. The case-lock mechanism includes the case-lock switch 170, a lock member 172 and an engagement portion 174 that cooperate with each other. On the camera body 150 are provided the case-lock switch 170 and the lock member 172, while the engagement portion 174 is formed on the case 160.

An end of the lock member 172 is attached to the camera body 150. The lock member 172 is forced toward the case 160, and another end of the lock member 172 is engaged with the engagement portion 174 of the case 160 when the case-lock switch 179 is not pressed. It is preferable that the end of the lock member 172 to be engaged with the engagement portion 174 is formed to be wedge-shaped. Also, it is preferable that the engagement portion 174 has a shape corresponding to the shape of the end of the lock member 172. Since the movement of the case 160 with respect to the camera body 150 is locked when the end of the lock member 172 is engaged with the engagement portion 174, it is possible to prevent the operator from drawing the camera body 150 from the case 160 by mistake.

It should be noted that the operator can draw the camera body 150 from the case 160 by pushing the case-lock switch 170 when the battery has to be exchanged for a new one. By pushing the case-lock switch 170, the end of the lock member 172 is released from the engagement portion 174, so that the lock is released.

Figure 11C:
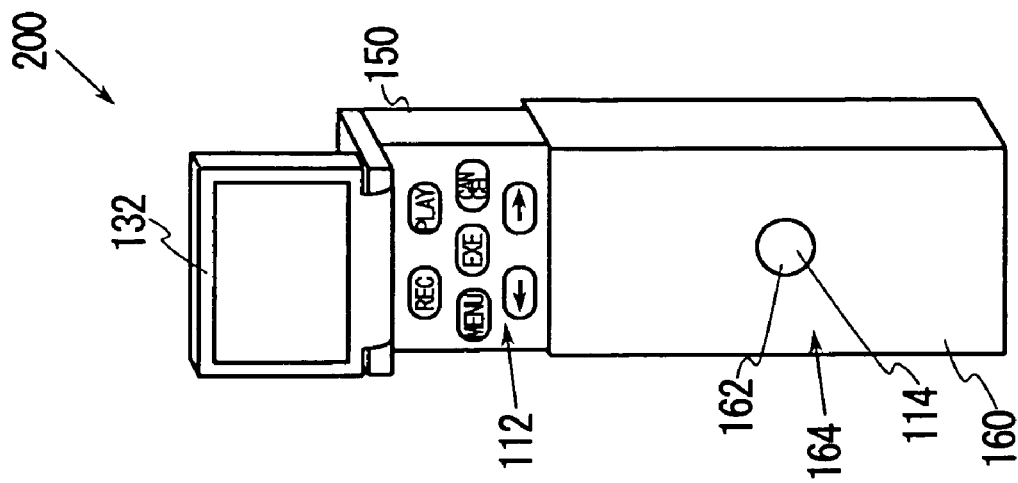
FIGS. 11A, 11B and 11C show a modified example of the image capturing apparatus 200 and are perspective views showing a front face 164 of the case 160.
Figure 11B:
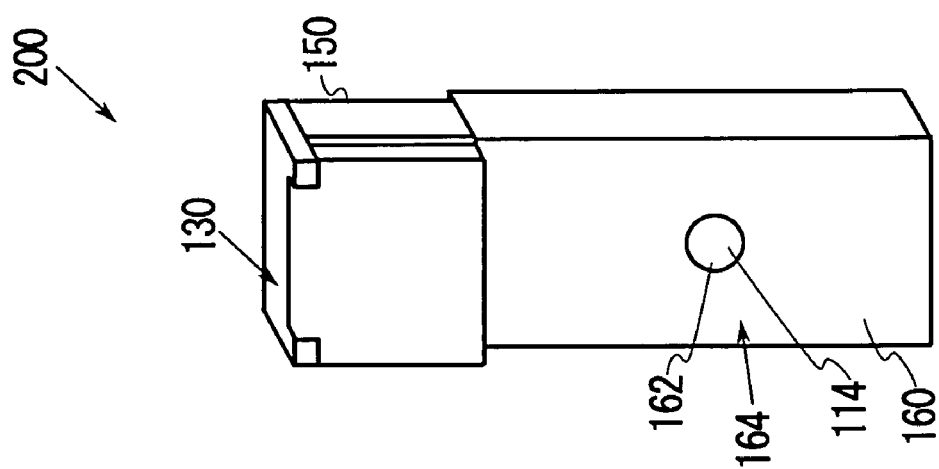
Figure 11A:
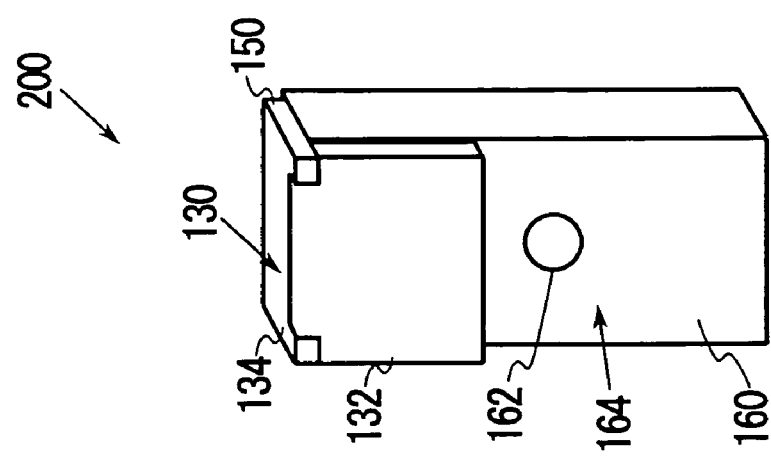

FIGS. 11A, 11B and 11C are perspective view of a modified example of the image capturing apparatus 200 of the second embodiment of the present invention and show the front face 164 of the case 160. In this modified example, the image capturing apparatus 200 is composed of the camera body 150 and the case 160. The camera body 150 includes the image display device 130 explained with reference to FIGS. 3A through 4D. The image display device 130 is attached to the upper face of the camera body 150 in such a manner that the image display device 130 can rotate around an axis along the direction of the movement of the case 160 with respect to the camera body 150. The image monitor 132 of the image display device 130 is supported by the support 134 in such a manner that the angle between the image monitor 132 and the support 134 can be adjusted.

FIG. 11A shows a state where the camera body 150 is accommodated in the case 160, that is, the camera body 150 is at the first position with respect to the case 160. The release switch 114 remains inside the case 160 and therefore is not exposed through the opening 162. The image monitor 132 is folded over the front face 164 of the case 160 around a rotation axis provided on an end of the support 134. The panel, such as an LCD, of the image monitor 132 faces the front face 164, thereby being protected from being damaged.

FIG. 11B shows a state where the camera body 150 is drawn out from the case 160, that is, the camera body 150 is at the second position with respect to the case 160. At this state, the release switch 114 appears outside the case 160 through the opening 162 of the case 160.

FIG. 11c shows a state where the image monitor 132 is rotated around the rotation axis provided on the support 134 by 180 degrees from the position shown in FIG. 11B. At this state, the operation switches 112 that were covered by the image monitor 132 appear. Thus, the operator can operate the image capturing apparatus 200.

Figure 12A:
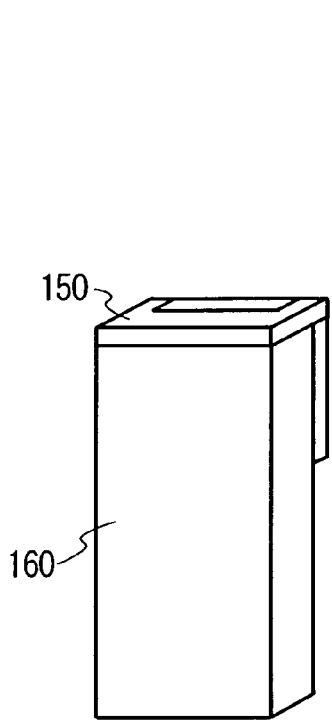
FIGS. 12a, 12B and 12C are perspective views of the image capturing apparatus 200 shown in FIGS. 11A through 11C, showing the back thereof.
Figure 12B:
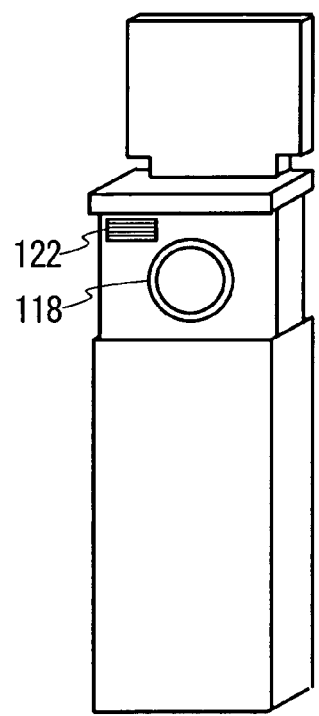
Figure 12C:
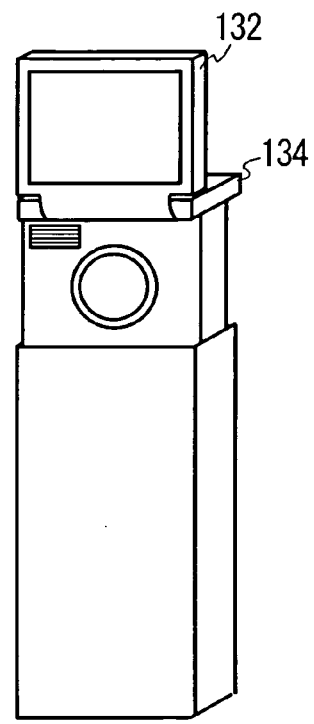

FIGS. 12A, 12B and 12C are perspective views of the image capturing apparatus 200 shown in FIGS. 11A through 11C, showing the back of the image capturing apparatus 200.

FIG. 12A shows the state where the camera body 150 is at the first position with respect to the case 160. At this state, the capturing lens 118 and the flash mechanism 122 are covered with the case 160 and therefore do not appear, as shown in FIG. 12A.

FIG. 12B shows the state where the camera body 150 is at the second position with respect to the case 160. At this state, the capturing lens 118 and the flash mechanism 122 appear outside the case 160. Thus, the operator can operate the image capturing apparatus 200.

FIG. 12C shows a state where the support 134 is rotated around an axis along the longitudinal direction of the image capturing apparatus 200 by 180 degrees so as to make the screen of the image monitor 132 face the back direction. As described with reference to FIG. 3C, the support 134 is attached to an end, i.e., the upper face of the camera body 150 in such a manner that the support 134 can rotate around the axis along the direction of the movement of the case 160 with respect to the camera body 150 (that is, the longitudinal direction of the image capturing apparatus 200). Since the image monitor 132 is supported by the support 134, it is rotated together with the support 134.

FIGS. 13A, 13B and 13C show another modified example of the image capturing apparatus 200 of the second embodiment of the present invention, showing the image capturing apparatus 200 in which the image monitor 132 can be accommodated in the case 160.

FIG. 13A shows a state where the camera body 150 is accommodated in the case 160. Unlike the arrangement shown in FIG. 11A, the image monitor 132 is accommodated in the case 160 in the arrangement shown in FIG. 13A. It is preferable to cut away a part of the camera body 150 so as to have a notch enabling the image monitor 132 to be accommodated in the case 160. According to the arrangement of the image capturing apparatus 200 in this modified example, since the image monitor 132 is not exposed to the outside of the case 160 when the camera body 150 is accommodated in the case 160, it is possible to reduce the risk of damaging the image monitor 132. FIG. 13B shows a state where the camera body 150 is drawn from the case 160 and the image monitor 132 is raised.

FIG. 13C is a side view of the camera body 150 in this modified example. As shown in FIG. 13C, the camera body 150 has a notch 136. It is preferable that the notch 136 has a shape corresponding to the shape of the image monitor 132. Moreover, it is preferable that the image monitor 132 is rotated by 180 degrees in a direction shown by an arrow to be accommodated in the notch 136, as shown in FIG. 13C.

FIG. 14 shows another modified example of the image capturing apparatus 200 in the second embodiment of the present invention. The image capturing apparatus 200 shown in FIG. 14 includes the case 160 having a plurality of openings. Preferably, the plurality of openings 162a and 162b are provided on different faces of the case 160. In this modified example, the opening 162a is provided on the front face 164 of the case 160 while the opening 162b is provided on the right side face of the case 160, as shown in FIG. 14. In another example, the openings may be provided on the front face 164 and the left side face. Alternatively, the openings may be provided on three faces, i.e., the front face 164 and the right and left side faces. Moreover, the back may be provided with the opening. Furthermore, in the case where the capturing lens can be made to appear on the back of the case 160, the opening may be provided on the bottom of the case 160.

The camera body 150 includes a plurality of release switches 114 (not shown) so as to correspond to the positions of the openings 162a and 162b. When the release switch is provided on the side face of the image capturing apparatus 200, the operator can operate the image capturing apparatus 200 easily even if the image capturing apparatus 200 is laid down. In this case, the operator may push the release switch through the opening 162b by his/her index finger so as to trip the shutter.

Figure 15A:
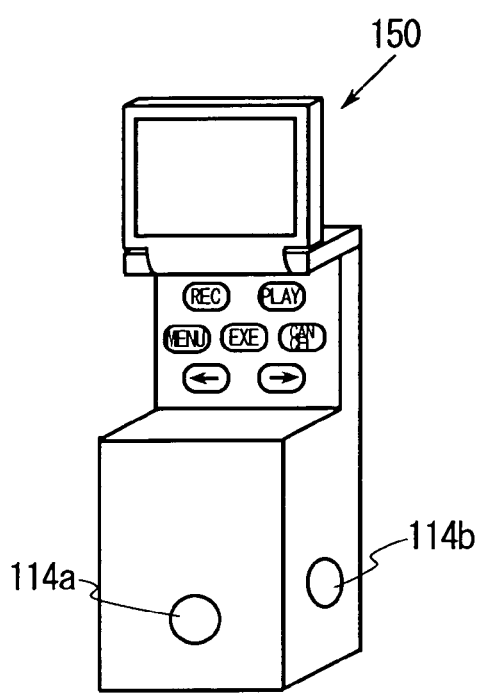
FIGS. 15A and 15B are diagrams schematically showing structures of the camera body 150 and the case 160 constituting the image capturing apparatus 200 shown in FIG. 14.
Figure 15B:
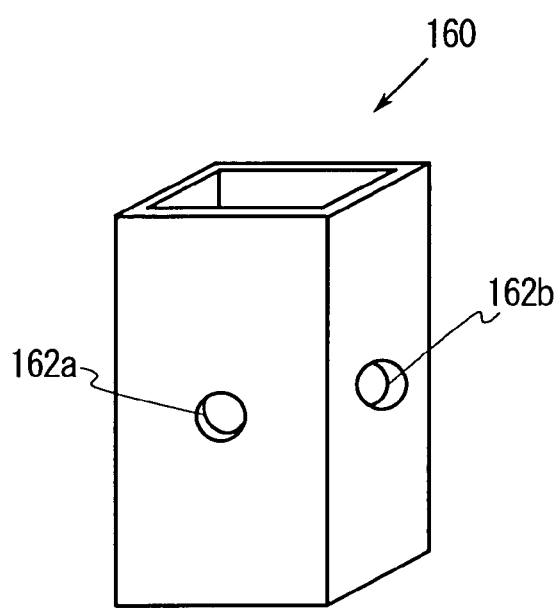

FIGS. 15A and 15B respectively show the arrangements of the camera body 150 and the case 160 constituting the image capturing apparatus 200 shown in FIG. 14.

FIG. 15A shows the camera body 150 having two release switches 114a and 114b. The release switch 114b is provided on the different face from the face on which the release switch 114a is provided. In the arrangement shown in FIG. 15A, the release switch 114a is provided on the front face of the camera body 150 while the release switch 114b is provided on the right side face of the camera body 150. Alternatively, one of the release switches may be provided on the left side face of the camera body 150, or the release switches may be provided on the three faces, that is, the front face and the right and left side faces. In addition, the release switch may be provided on the back. Further more, if the capturing lens can be exposed to the outside of the case 160 in the back of the case 160 when the camera body 150 is at the first position with respect to the case 160, the release switch may be provided on the bottom of the camera body 150.

FIG. 15B shows the case 160 including two openings 162a and 162b. The opening 162b is provided on the different face from the face on which the opening 162a is provided. With reference to FIG. 15A, the opening 162a is provided at such a position that the operator can push the release switch 114a, while the opening 162b is provided at such a position that the operator can push the release switch 114b.

Figure 16A:
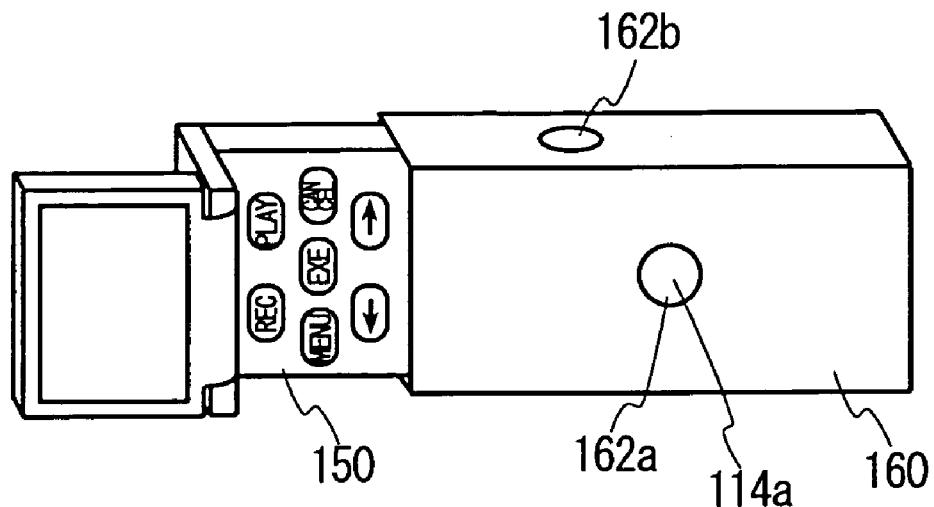
FIGS. 16A and 16B show the image capturing apparatus 200 having a structure in which one of the release switches can be exposed through the corresponding opening by drawing the camera body 150 from the case 160 in stages.
Figure 16B:
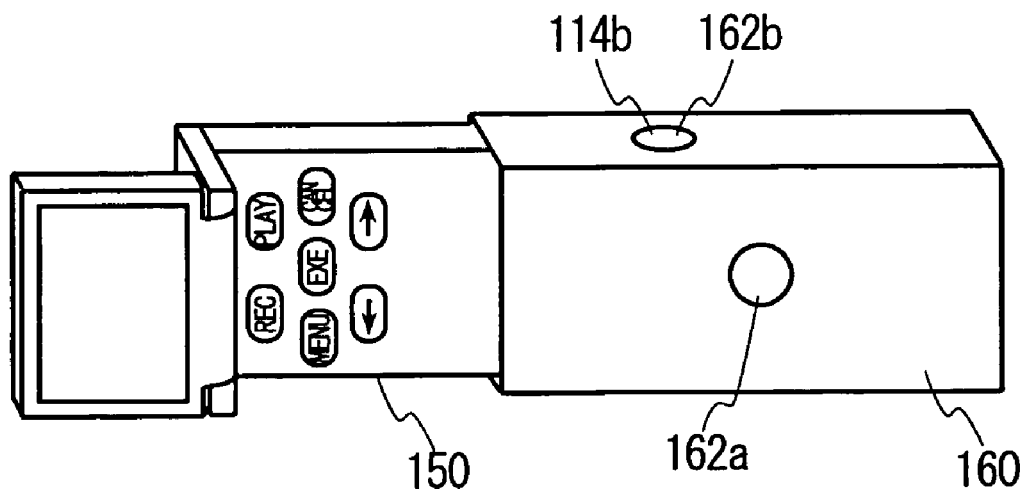

FIGS. 16A and 16B show the image capturing apparatus 200 having a structure in which one release switch is made to appear by drawing the camera body 150 from the case 160 in stages. In this capturing apparatus 200, the operator cannot push the plurality of release switches at once. The case 160 includes the openings 162a and 162b provided at positions apart from the bottom of the case 160, the distance between the opening 162a and the bottom being different from that between the opening 162b and the bottom.

FIG. 16A shows a state where the camera body 150 is drawn to the second position from the first position with respect to the case 160. At this state, the release switch 114a appears through the opening 162a, whereas the release switch 114b does not appear through the opening 162b.

FIG. 16B shows a state where the camera body 150 is further drawn to reach a third position from the second position with respect to the case 160. At this state, the release switch 114b appears through the opening 162b, whereas the release switch 114a does not appear through the opening 162a.

As is apparent from the above, in the arrangement of the image capturing apparatus 200 shown in FIGS. 16A and 16B, the plurality of release switches cannot be operative simultaneously. Therefore, it is possible to make an appropriate one of the release switches operative in accordance with the selection of shooting modes of the image capturing apparatus 200. For example, the operator can adjust the distance by which the camera body 150 is drawn so as to make the release switch 114a operative when a vertical shooting mode in which the image capturing apparatus 200 is kept vertical is selected, or to make the release switch 114b operative when a horizontal shooting mode in which the image capturing apparatus 200 is laid is selected.

In another example, the camera body 150 may include a tilt detection sensor (not shown) and make one of the release switches 114a and 114b operative in accordance with the output of the tilt detection sensor. The tilt detection sensor detects a tilt of the camera body 150 with respect to the horizontal direction and outputs a tilt signal indicative of a degree of the current tilt to a CPU (not shown) in the camera body 150. The tilt detection sensor can detect the tilt with respect to the horizontal direction based on a change in a magnetic field caused by a positional shift of a spherical magnet included therein.

The CPU then determines which one of the release switches 114a and 114b is to be made operative based on the tilt signal. In a case where the angle of the image capturing apparatus 200 with respect to the horizontal direction is detected to be 45 degrees or more, for example, the CPU may determine that the vertical shooting mode should be selected and make the release switch 114a operative while making the release switch 11b inoperative. On the other hand, the angle of the image capturing apparatus 200 with respect to the horizontal plane is detected to be less than 45 degrees, the CPU may determine that the horizontal shooting mode should be selected and therefore make the release switch 114b operative while making the release switch 114a inoperative. In this way, the release switch 114a or 114b may be made operative or inoperative based on the tilt signal.

Figure 17A:
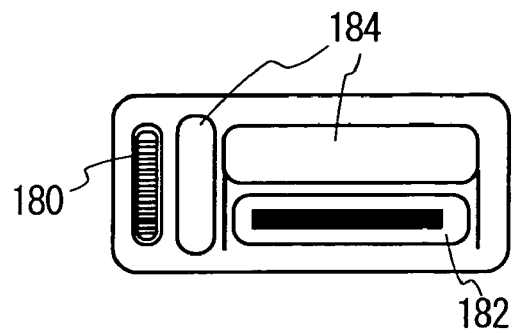
FIGS. 17A, 17B and 17C show an example of a bottom of the image capturing apparatus 200.
Figure 17B:
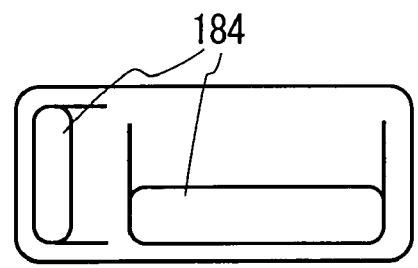
Figure 17C:
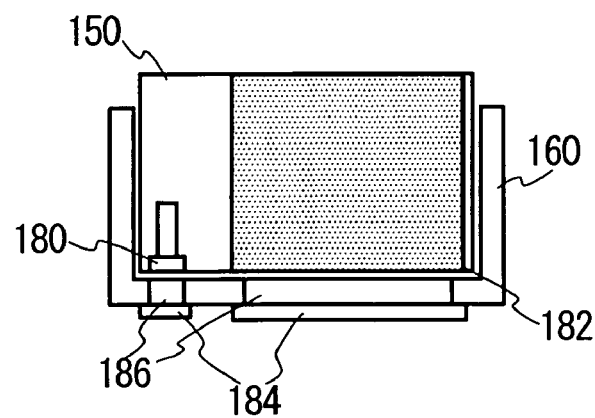

FIGS. 17A, 17B and 17C show an example of the bottom of the image capturing apparatus 200. In this example, the camera body 150 includes on the bottom thereof a terminal to be electrically connected to an external device and an insertion opening into which a recording medium can be inserted, and the case 160 includes on the bottom thereof terminal-openings at positions respectively corresponding to the terminal and the insertion opening.

FIG. 17A shows the bottom of the image capturing apparatus 200 when the camera body 150 is at the first position with respect to the case 160. On the bottom of the camera body 150, the terminal 180 and the insertion opening 182 into which a recording medium can be inserted are formed. On the other hand, on the bottom of the case 160, the terminal-openings are provided. In addition, slidable terminal-covers 184 are provided on the case 160 for covering the terminal-openings when the terminal 180 and the insertion-opening are not used. The terminal-openings are formed to have shapes respectively corresponding to the shapes of the terminal 180 and the insertion-opening 182. Also, the positions of the terminal-openings on the case 160 are determined considering the positions of the terminal 180 and the insertion-opening 182 on the camera body 150. In the arrangement shown in FIG. 17A, the terminal-covers 184 do not cover the terminal-openings.

FIG. 17B shows a state where the terminal-covers 184 slide from the positions shown in FIG. 17A so as to cover the terminal-openings. At this state, the terminal 180 and the insertion-opening 182 are not exposed to the outside and therefore are inoperative. When there is no need to use the terminal 180 or the insertion-opening 182, it is desirable to cover the corresponding terminal-opening by the terminal-cover 184 in order to prevent dust from entering from the terminal-opening.

FIG. 17C shows a cross-section of the bottom of the image capturing apparatus 200 when the terminal-covers 184 cover the terminal-openings 186. The terminal-openings 186 are formed to have shapes corresponding to the shapes of the terminal 180 and the insertion-opening 182, respectively, and therefore the terminal 180 and the insertion-opening 182 can be exposed to the outside through the respective terminal-openings 186. When the terminal-covers 184 are made to slide so as to open the terminal 180 and the insertion-opening 182, it is possible to insert a cable or a recording medium into the camera body 150 through the terminal-opening 186.

Figure 18A:
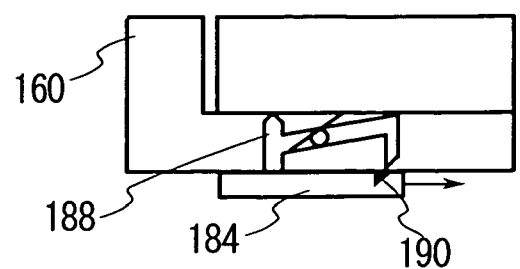
FIGS. 18A and 18B a cover-lock mechanism for locking a terminal-cover 184 to the case 160, including a lock member 188.
Figure 18B:
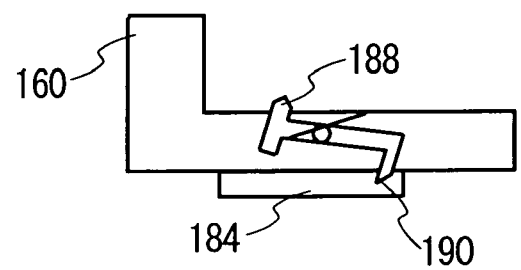

FIGS. 18A and 18B show a cover-lock mechanism that locks the terminal-covers 184 to the case 160. The cover-lock mechanism includes a lock member 188. The lock member 188 is supported by the case 160 at a point by means of a pin, and a part of the lock member 188 is connected to the camera body 150 by means of a thread-like member. The terminal-cover 184 is provided with an engagement portion 190. An end of the lock member 188 is formed to be wedge-shaped and is engaged with the engagement portion 190 when the terminal-cover 184 is locked. While the capturing operation is performed, the terminal 180 and the insertion-opening 182 shown in FIGS. 17A through 17C cannot be used for connecting the cable to the camera body 150 or inserting/removing the recording medium into/from the camera body 150. Thus, it is preferable that the terminal-cover 184 can be locked in order to prevent dust or the like from entering the inside of the case 160 through the terminal 186.

FIG. 18A shows the lock mechanism when the camera body 150 is accommodated in the case 160. At this state, the terminal-cover 184 is freely slidable and the cable or the recording medium can be inserted into the terminal 180 or the insertion-opening 182. FIG. 18B shows the lock mechanism when the camera body 150 is drawn out from the case 160. At this state, the wedge-shaped end of the lock member 188 is engaged with the engagement portion 190, thereby the terminal-cover 184 is locked.

Figure 19:
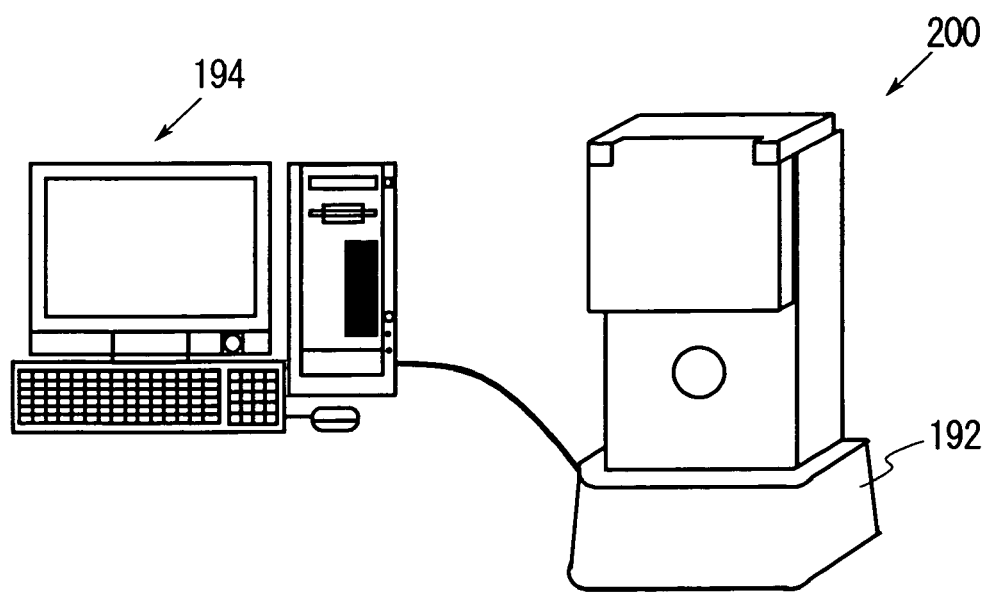
FIG. 19 shows the image capturing apparatus 200 placed on a cradle.

FIG. 19 shows the image capturing apparatus 200 placed on a cradle 192. The cradle 192 is a terminal that can be used both for charging a battery and for transmitting data to an external device, and connects the image capturing apparatus 200 to a device for charging of the battery and for data transmission or a personal computer (PC) 194. In a case of using a universal serial bus (USB), for example, the image capturing apparatus 200 can be charged via a USB terminal or can transmit image data directly to the PC 194.

Embodiment 3

Figure 20:
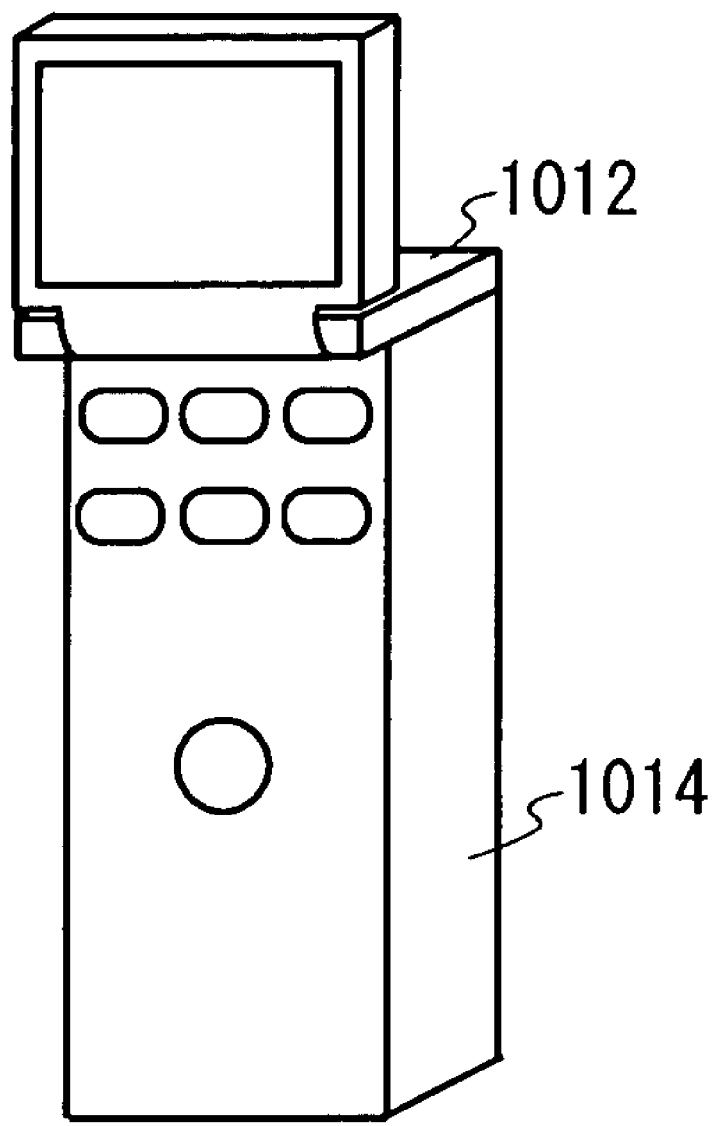
FIG. 20 is a perspective view of an image capturing apparatus 1000 according to the third embodiment of the present invention.

FIG. 20 is a perspective view of an image capturing apparatus 1000 according to the third embodiment of the present invention. The image capturing apparatus 1000 includes a camera body 1012 and a case 1014. The case 1014 covers the camera body 1012 in such a manner that the camera body 1012 can move in one direction only. FIG. 20 shows a state where the camera body 1012 is accommodated in the case 1014 and an image monitor is raised. The state shown in FIG. 20 is a "playback mode" of the image capturing apparatus 1000. The playback mode is described later. One of the primary features of the image capturing apparatus 1000 in the present embodiment is that the apparatus is designed to have a vertical shape which enables the operator to make operations by a single hand.

FIGS. 21A, 21B and 21C are perspective views of the camera body 1012 and the case 1014 constituting the image capturing apparatus 1000 in the present embodiment. More specifically, FIGS. 21A and 21B are perspective views showing the camera body 1012, while FIG. 21C is a perspective view illustrating the case 1014. The camera body 1012 and the case 1014 are formed as separate structures. The camera body 1012 can be accommodated in the case 1014 and can be drawn out from the case 1014.

FIG. 21A shows a front face 1030 of the camera body 1012 in the present embodiment. The camera body 1012 includes operation switches 1022 and a release switch 1024 on the front face 1030, and further includes an image monitor unit 1016 rotatably attached to an end of an upper portion thereof. In addition, the camera body 1012 includes on the upper face thereof an upper lid 1020 having a rotation axis at its end. To the rotation axis of the upper lid 1020, the image monitor unit 1016 is rotatably attached. Alternatively, the image monitor unit 1016 may be rotatably attached to the end of the upper portion of the camera body 1012 directly or via another structure. The image monitor unit 1016 includes an image monitor 1018 that can display a subject. The release switch 1024 serves as a shutter button to be pushed by the operator. The operation switches 1022 include several switches required for operating the image capturing apparatus 1000, such as a record switch (REC) or a playback switch (PLAY). The details of the operation switches 1022 will be described later.

At the state shown in FIG. 21A, the image monitor unit 1016 is raised. The operator can capture an image of the subject by pressing the release switch 1024 while viewing the subject displayed by the image monitor 1018 in a "shooting mode" of the image capturing apparatus 1000. On the other hand, the operator can check the captured image that has been already recorded by means of the image monitor 1018 in the "playback mode" of the image capturing apparatus 1000. When the image monitor unit 1016 is rotated in such a manner that the image monitor 1018 covers the front face 1030 of the camera body 1012, the operator cannot view the screen of the image monitor 1018. The power of the image capturing apparatus 1000 may be turned off when the image monitor 1018 is closed.

It is preferable that the upper lid 1020 is attached to the upper face of the camera body 1012 in such a manner that the upper lid 1020 can be rotated around an axis along the direction of the movement of the case 1014 with respect to the camera body 1012 (that is, the longitudinal direction of the image capturing apparatus 1000). By attaching the upper lid 1020 in the above-mentioned manner, it is possible for the operator to capture an operator's image while the screen of the image monitor 1018 faces the operator.

It is desirable that the release switch 1024 is provided on the front face 1030 substantially at the center in a direction perpendicular to the longitudinal direction of the image capturing apparatus 1000. In other words, it is preferable to arrange the release switch 1024 at the center in the lateral direction on the front face 1030 of the image capturing apparatus 1000. By arranging the release switch 1024 in the above-mentioned manner, the operator can push the release switch 1024 either by the right hand or by the left hand without feeling any inconvenience. In addition, it is preferable that the release switch 1024 is arranged at such a position that the operator can push it by a thumb while grasping the image capturing apparatus 1000 by his/her hand.

FIG. 21B shows a back 1032 of the camera body 1012 in the present embodiment. The camera body 1012 includes a capturing lens 1034 and a flash mechanism 1036 on the back 1032 thereof. In the shooting mode, an image signal obtained through the capturing lens 1034 is subjected to a signal processing operation in the image capturing apparatus 1000 and is then displayed on the screen of the image monitor 1018. The flash mechanism 1036 can be used to provide additional light in a low-light condition.

FIG. 21C shows a front face 1044 of the case 1014 in the present embodiment. The case 1014 includes a release-switch opening 1040 provided on the front face 1044 that allows the operator to push the release switch 1024. The opening 1040 can expose the release switch 1024 to the outside of the case 1014. Also, the case 1014 includes a plurality of operation-switch openings 1042 provided for allowing the operator to push the operation switches 1022. The openings 1042 can expose the operation switches 1022 to the outside of the case 1014, respectively. It is preferable that the openings 1040 and 1042 are covered with a cover of an elastic material so as to prevent dust from entering into a space between the case 1014 and the camera body 1012.

The case 1014 includes a grip to be grasped by the operator's hand that is composed of parts of the faces thereof. For example, the grip may be defined as all the areas of the case body except for the areas having the openings 1040 and 1042. Alternatively, as for the front face 1044, the area below the opening 1040 may be defined to constitute the grip.

Figure 22:
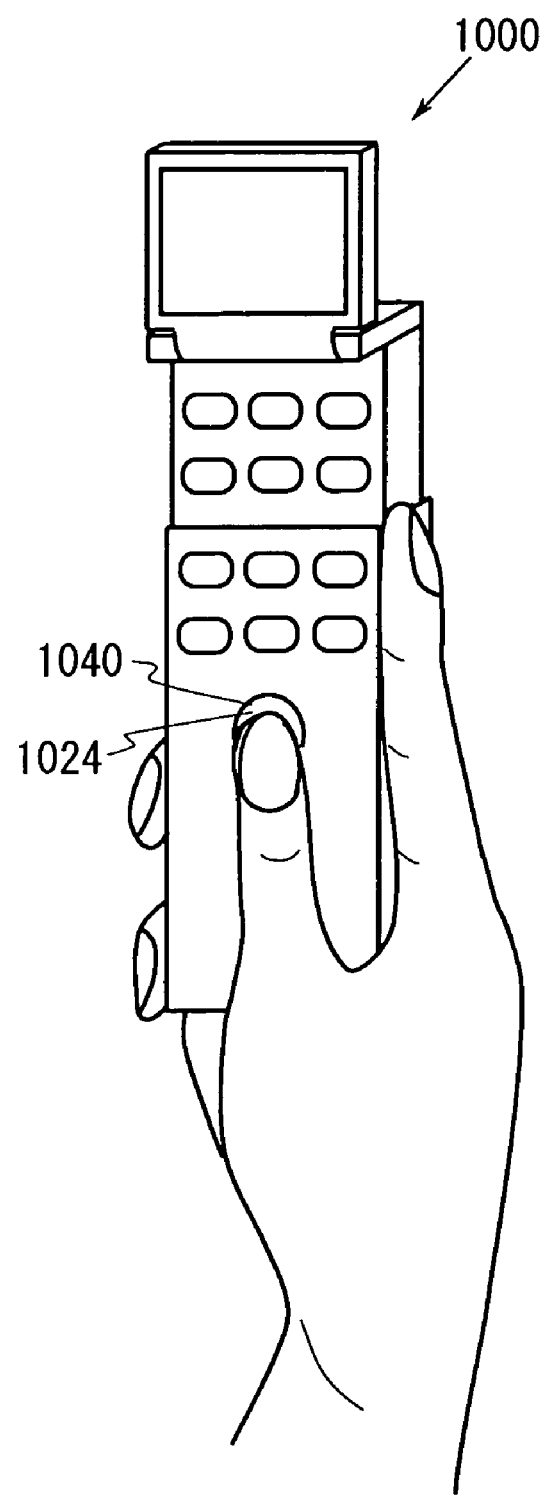
FIG. 22 shows a state where the image capturing apparatus 1000 is grasped by the operator in a shooting mode.

FIG. 22 shows a state where the image capturing apparatus 1000 is grasped by the operator in the shooting mode. In the shooting mode, the camera body 1012 is drawn out from the case 1014 so that the release switch 1024 reaches such a position that the operator can press it. The manner of grasping the image capturing apparatus 1000 is not limited to that shown in FIG. 22. However, it is preferable that the release switch 1024 is provided at such a position that the operator can push the release switch 1024 by a thumb.

Figure 23C:
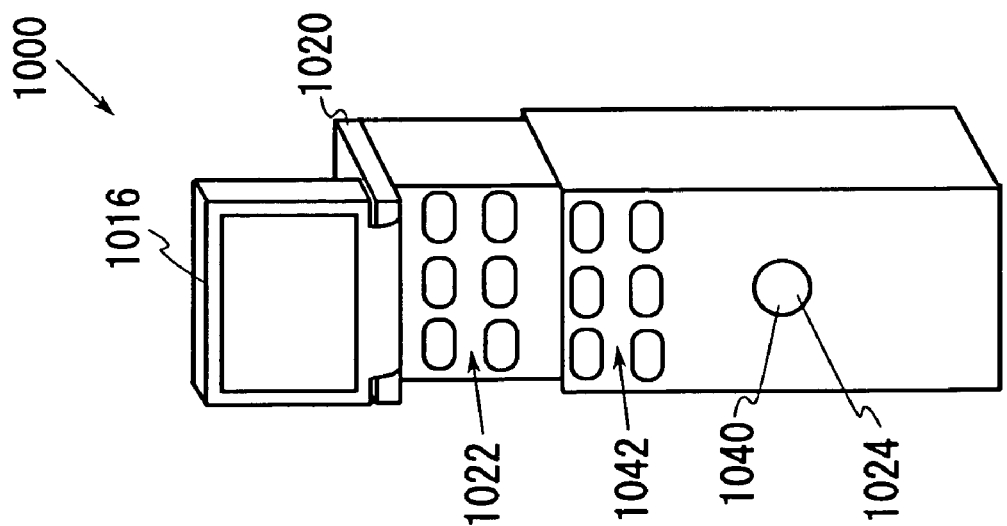
FIGS. 23A, 23B and 23C are perspective views of the image capturing apparatus 1000, showing a front face 1044 of the case 1014.
Figure 23B:
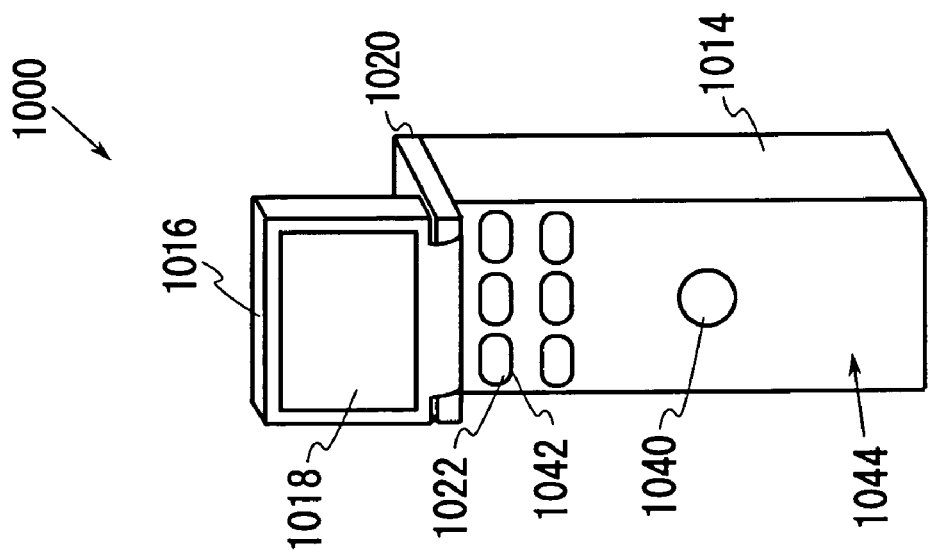
Figure 23A:
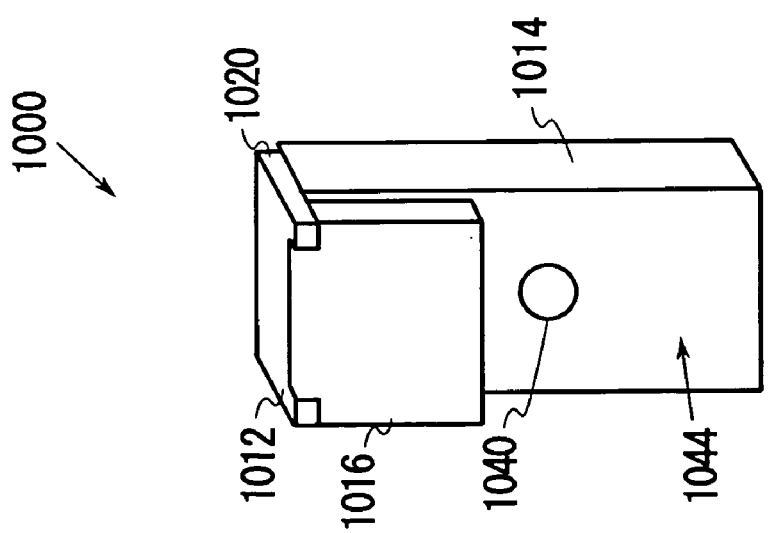

FIGS. 23A, 23B and 23C are perspective views of the image capturing apparatus 1000 in the present embodiment, showing the front face 1044 of the case 1014. In the present embodiment, the image capturing apparatus 1000 can change its operation mode based on a positional relationship between the camera body 1012 and the case 1014 and a condition of the image monitor unit 1016.

FIG. 23A shows a state where the camera body 1012 is accommodated in the case 1014 so as to be at the accommodation position (first position). At this state, the release switch 1024 remains inside the case 1024, that is, it does not appear through the opening 1040. Thus, the operator cannot push the release switch 1024. The image monitor unit 1016 is rotated around the rotation axis provided on the end of the upper lid 1020, so that the image monitor 1018 faces the front face 1044. Since the image monitor 1018 faces the front face 1044, it is protected from being damaged. The operation switches 1022 are also covered with the image monitor unit 1016.

Preferably, a CPU (not shown) included in the camera body 1012 turns a power of the image capturing apparatus 1000 off or keeps it off when determining that the image monitor unit 1016 is not raised. It is possible to eliminate the possibility of the operation of the image capturing apparatus 1000 by mistake by turning the power of the image capturing apparatus 1000 off.

FIG. 23B shows a state where the camera body 1012 is at the first position with respect to the case 1014 while the image monitor unit 1016 is raised. As shown in FIG. 23B, the image monitor 1018 faces the operator. In addition, the operation switches 1022 appear through the openings 1042, so that the operator can press any of the operation switches 1022 through the corresponding opening 1042. The release switch 1024, however, remains inside the case 1014 as at the state shown in FIG. 23A, and therefore cannot be pushed by the operator.

At the state shown in FIG. 23B, it is preferable that the image capturing apparatus 1000 is in the playback mode. More specifically, the CPU provided in the camera body 1012 changes the operation mode of the image capturing apparatus 1000 into the playback mode when the CPU finds that the camera body 1012 is accommodated in the case 1013 and the image monitor unit 1016 raised. For example, the record switch (REC), that is one of the operation switches 1022, cannot be used in the playback mode. In addition, in a case where the opening 1042 is covered with a switch cover or the like, it is preferable that the switch cover indicates the functions that can be used in the playback mode, for example, "PLAY".

FIG. 23C shows a state where the camera body 1012 is drawn out from the case 1014 to be at the drawn-position (the second position). At this state, the image monitor unit 1016 is raised while the image monitor 1018 faces the operator. The operation switches 1022 appear from the upper portion of the case 1014, thus allowing the operator to push any of the operation switches 1022. In addition, the operator can push the release switch 1024 through the opening 1040.

At the state shown in FIG. 23C, it is preferable that the image capturing apparatus 1000 is in the shooting mode. More specifically, the CPU provided in the camera body 1012 changes the operation mode of the image capturing apparatus 1000 into the shooting mode when the CPU finds that the camera body 1012 is drawn from the case 1014 while the image monitor unit 1016 is raised. For example, the playback switch (PLAY), that is one of the operation switches 1022, cannot be used in the shooting mode. Preferably, the functions that can be used in the shooting mode, such as REC, are displayed on the surface of the operation switches 1022.

Figures 24A, 24B, 24C:
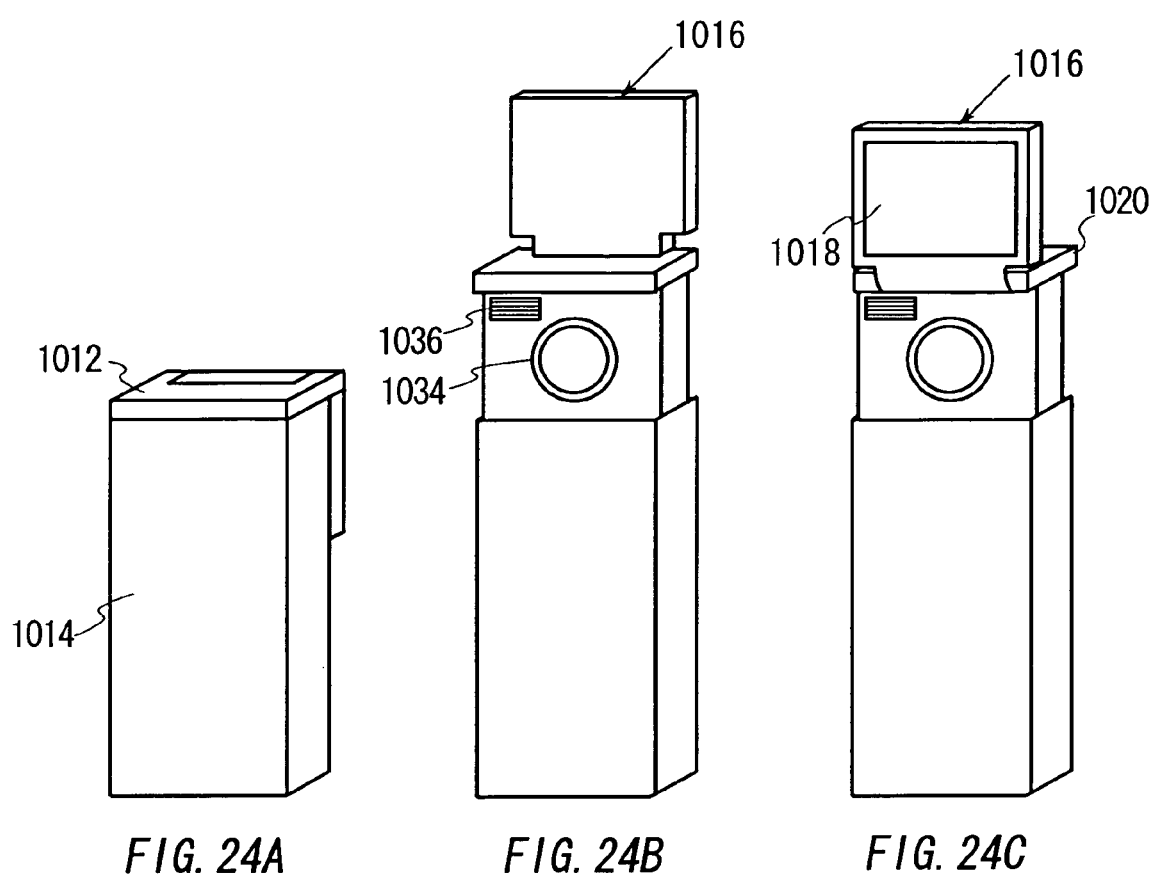
FIGS. 24A, 24B and 24C are perspective views of the image capturing apparatus 1000 shown in FIGS. 23A, 23B and 23C.

FIGS. 24A, 24B and 24C are perspective views of the image capturing apparatus 1000 shown in FIGS. 23A through 23C, showing the back of the image capturing apparatus 1000.

FIG. 24A shows the state where the camera body 1012 is at the first position with respect to the case 1014. At this state, the capturing lens 1034 and the flash mechanism 1036 are covered by the case 1014 and thus do not appear.

FIG. 24B shows the state where the camera body 1012 is at the second position with respect to the case 1014. At this state, the capturing lens 1034 and the flash mechanism 1036 appears from the case 1014. Since the image monitor unit 1016 is raised, the image capturing apparatus 1000 is in the shooting mode.

FIG. 24C shows a state where the upper lid 1020 is rotated by 180 degrees around an axis along the longitudinal direction of the image capturing apparatus 1000, so that the image monitor 1018 of the image monitor unit 1016 faces the back of the image capturing apparatus 1000. As described above with reference to FIG. 21A, it is preferable that the image monitor unit 1016 is supported by the upper lid 1020 and therefore is rotated together with the upper lid 1020. In this case, it is possible for the operator to capture the operator's image in a self-shooting mode while making the image monitor 1018 face the operator.

Figure 25A:
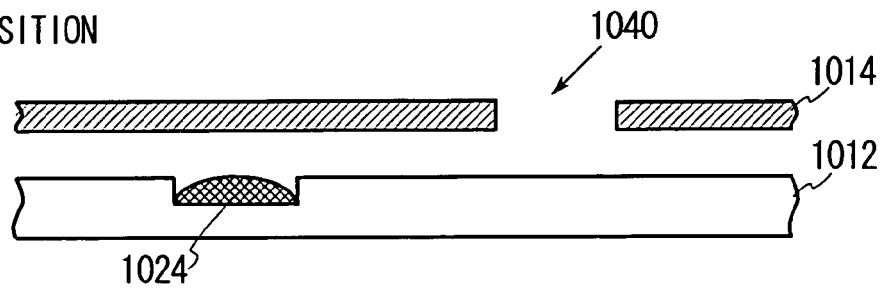
FIGS. 25A and 25B are diagrams showing a positional relationship between the release switch 1024 of the camera body 1012 and an opening 1040 of the case 1014.
Figure 25B:
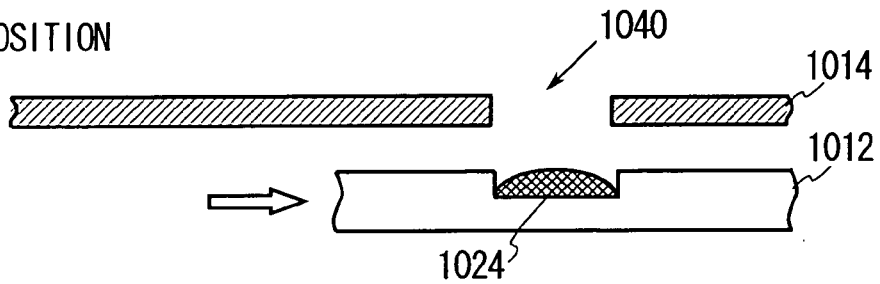

FIGS. 25A and 25B show a positional relationship between the release switch 1024 of the camera body 1012 and the opening 1040 of the case 1014.

FIG. 25A is a diagram showing the positional relationship between the release switch 1024 and the opening 1040 when the camera body 1012 is at the first position with respect to the case 1014. At this state, the positions of the release switch 1024 and the opening 1040 are not coincident with each other. Therefore, the release switch 1024 is not exposed to the outside of the case 1014, thus preventing the operator from pushing the release switch 1024. When the image capturing apparatus 1000 is not in use, it is possible to prevent the release switch 1024 from being pushed by mistake by accommodating the camera body 1012 in the case 1014.

FIG. 25B is a diagram showing the positional relationship between the release switch 1024 and the opening 1040 when the camera body 1012 is at the second position with respect to the case 1014. At this state, the positions of the release switch 1024 and the opening 1040 are coincident with each other. Therefore, the release switch 1024 appears outside the case 1014 through the opening 1040, allowing the operator to push the release switch 1024.

Figure 26A:
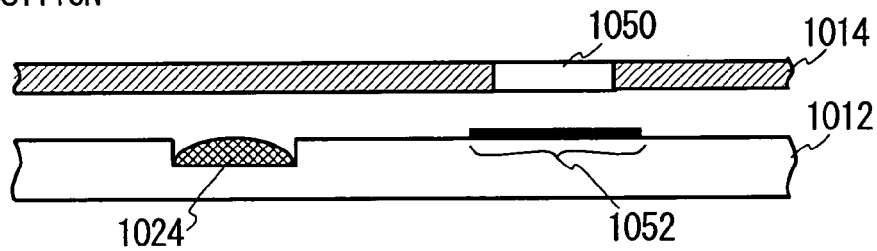
FIGS. 26A and 26B are diagrams showing a relationship between the release switch 1024 of the camera body 1012 and a switch cover 1050 of the case 1014.
Figure 26B:
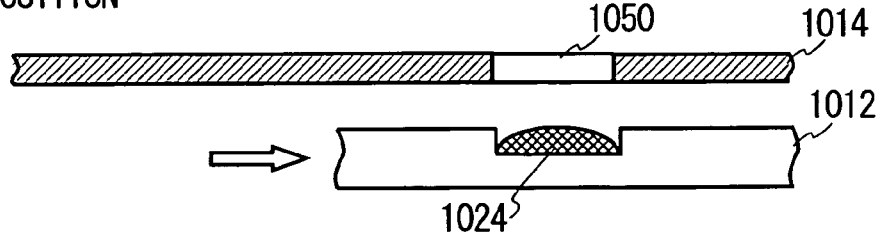

FIGS. 26A and 26B are diagrams showing a positional relationship between the release switch 1024 of the camera body 1012 and a switch cover 1050 of the case 1014. Preferably, the switch cover 1050 is formed of an elastic material to cover the opening 1040. By providing the switch cover 1050 in the opening 1040, it is possible to prevent dust, rain drop or the like from entering the space between the camera body 1012 and the case 1014 through the opening 1040. The operator can push the release switch 1024 via the switch cover 1050.

A region 1052 of the camera body 1012 may be painted in a different color from that of the release switch 1024, as shown in FIG. 26A, in order to notify the operator that the release switch cannot be pushed when the camera body 1012 is at the first position with respect to the case 1014. In this case, the operator can find that the release switch 1024 is inoperative by perceiving the color of the region 1052 of the camera body 1012 through the opening 1040 or the switch cover 1050. For example, the region 1052 may be painted in a noticeable color, such as black, or a different color from that of the case 1014.

On the other hand, it is preferable that the operator can perceive through the opening 1040 the release switch 1024 having the different color from the region 1052 when the camera body 1012 is at the second position with respect to the case 1024, as shown in FIG. 26B.

Figure 27A:
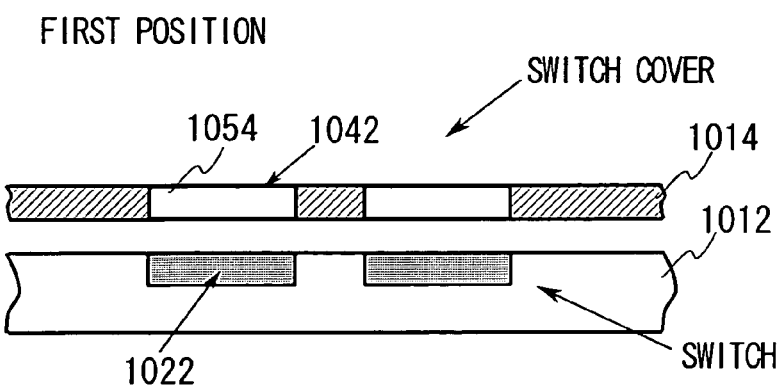
FIGS. 27A and 27B are diagrams showing a positional relationship between operation switches 1022 of the camera body 1012 and corresponding openings 1042 of the case 1014.
Figure 27B:
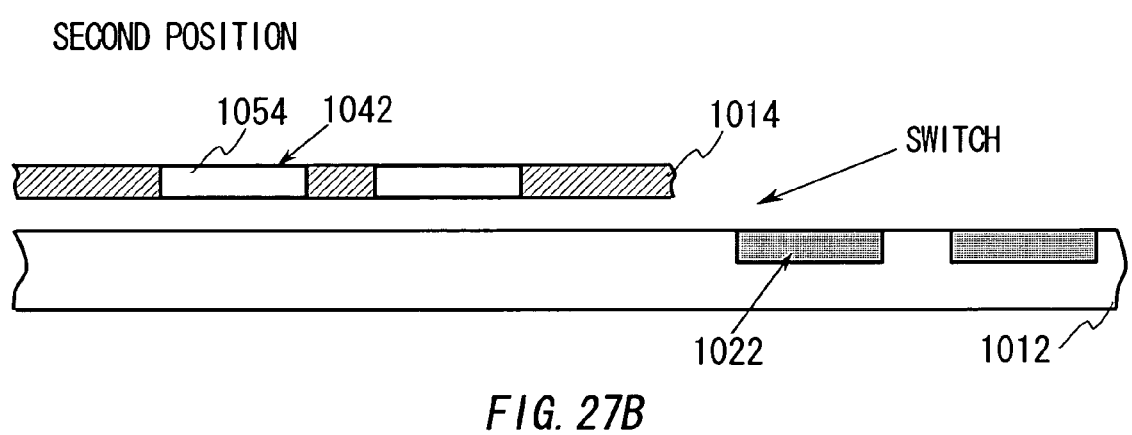

FIGS. 27A and 27B are diagrams showing a positional relationship between the operation switches 1022 of the camera body 1012 and the openings 1042 of the case 1014. The openings 1042 are covered with switch covers 1054, respectively. On the surface of each switch cover 1054, there is an indication for the playback mode. On the other hand, there is an indication for the shooting mode on the surface of each operation switch 1022.

FIG. 27A shows the positional relationship between the operation switches 1022 and the openings 1042 when the camera body 1012 is at the first position with respect to the case 1014. At this state, the positions of the operation switch 1022 and the corresponding opening 1042 are coincident with each other. Therefore, when the image monitor unit 1016 is raised, the operator can push the operation switches 1022 as switches for the playback mode.

FIG. 27B shows the positional relationship between the operation switches 1022 and the openings 1042 when the camera body 1012 is at the second position with respect to the case 1014. At this state, the operation switch 1022 is not positioned under the corresponding opening 1042 but is exposed from the upper portion of the case 1014. Thus, the operator can push the operation switches 1022 as switches for the shooting mode.

A relationship between the switches for the playback mode and those for the shooting mode in the present embodiment is described below. In typical cases, the switches for the playback mode includes the playback switch (PLAY) while the switches for the shooting mode includes the record switch (REC). When the camera body 1012 is at the first position with respect to the case 1014, as shown in FIG. 27A, one of the operation switches 1022 is used as the playback switch. The corresponding switch cover 1054 for covering the playback switch has an indication of PLAY. The CPU of the camera body 1012 controls this operation switch 1022 to have a function of the playback switch.

On the other hand, when the camera body 1012 is at the second position with respect to the case 1014, as shown in FIG. 27B, the same operation switch 1022 may be used as the record switch. In this case, this operation switch 1022 has an indication of REC on its surface. The CPU of the camera body 1012 changes the function of this operation switch 1022 to have the function of the record switch. As described above, in the image capturing apparatus 1000 of the present embodiment, the function of the operation switch is switched between the function for the reproduction mode and that for the shooting mode in accordance with the operation mode selection. Therefore, the switch for the shooting mode cannot be pushed in the playback mode, while the switch for the playback mode cannot be pushed in the shooting mode. Therefore, the possibility that the operator performs the wrong operation by pushing the wrong operation switch is reduced, thereby realizing the image capturing apparatus 1000 that is easy to be operated by the operator.

FIGS. 28A and 28B show an example of a detector 1060 for detecting whether or not the camera body 1012 is accommodated in the first position (accommodation position) of the case 1014. Preferably, the detector 1060 may be provided on the camera body 1012. The detector 1060 of the present example includes two conductive members and detects that the camera body 1012 is accommodated in the accommodation position of the case 1014 when the two conductive members are brought into contact. In another example, the detector 1060 may have a different structure from that mentioned above.

FIG. 28A shows a state where the camera body 1012 is not accommodated in the accommodation position of the case 1014. At this state, the two conductive members of the detector 1060 are not in contact. On the other hand, FIG. 28B shows a state where the camera body 1012 is accommodated in the accommodation position of the case 1014. At this state, the two conductive members of the detector 1060 are in contact with each other. The detector 1060 can detect that the camera body 1012 is accommodated in the accommodation position of the case 1040 based on an electric current flowing when the conductive members are in contact.

FIGS. 29A and 29B show an example of a detector 1062 that detects whether or not the image monitor unit 1016 is fixed (locked) to a predetermined position with respect to the case 1014. Preferably, the detector 1062 is provided on the image monitor unit 1016. The detector 1062 of this example includes two conductive members as the detector 160 includes, and can detect that the image monitor unit 1016 is locked to the predetermined position when the two conductive members are brought into contact. The detector 1062 may have a different structure from that mentioned above.

FIG. 29A shows a state where the image monitor unit 1016 is not fixed to the predetermined position with respect to the case 1014. The two conductive members of the detector 1062 are not in contact with each other. On the other hand, FIG. 29B shows a state where the image monitor unit 1016 is fixed to the predetermined position. In this example, the image monitor unit 1016 is closed while the image monitor 1018 faces the case 1014. The two conductive members of the detector 1062 are in contact with each other. Thus, the detector 1062 can detect that the image monitor unit 1016 is fixed to the predetermined position.

The camera body 1012 includes the CPU for determining the operation mode of the image capturing apparatus 1000 based on the detection results of the detectors 1060 and 1062. When the detector 1062 detects that the image monitor unit 1016 is not fixed to the predetermined position while the detector 1060 detects the camera body 1012 is accommodated in the accommodation position of the case 1014, the CPU may set the operation mode of the image capturing apparatus 1000 to the playback mode. When the detector 1062 detects that the image monitor unit 1016 is not fixed to the predetermined position while the detector 1060 detects that the camera body 1012 is not accommodated in the accommodation position of the case 1014, the CPU may set the operation mode of the image capturing apparatus 1000 to the shooting mode. Furthermore, when the detector 1062 detects the image monitor unit 1016 is fixed to the predetermined position while the detector 1060 is accommodated in the accommodation position of the case 1014, the CPU may turn the power of the image capturing apparatus 1000 off.

As described above, the image capturing apparatus 1000 in the present embodiment can change its operation mode based on the opening/closing of the image monitor unit and/or the accommodation/drawing of the camera body 1012. Therefore, it is unnecessary to provide a switch for manually changing the operation mode, thereby reducing the number of the operation switches 1022 to be operated by the operator. Consequently, the operator can intuitively operate the image capturing apparatus 1000 without feeling any inconvenience.

Figure 30:
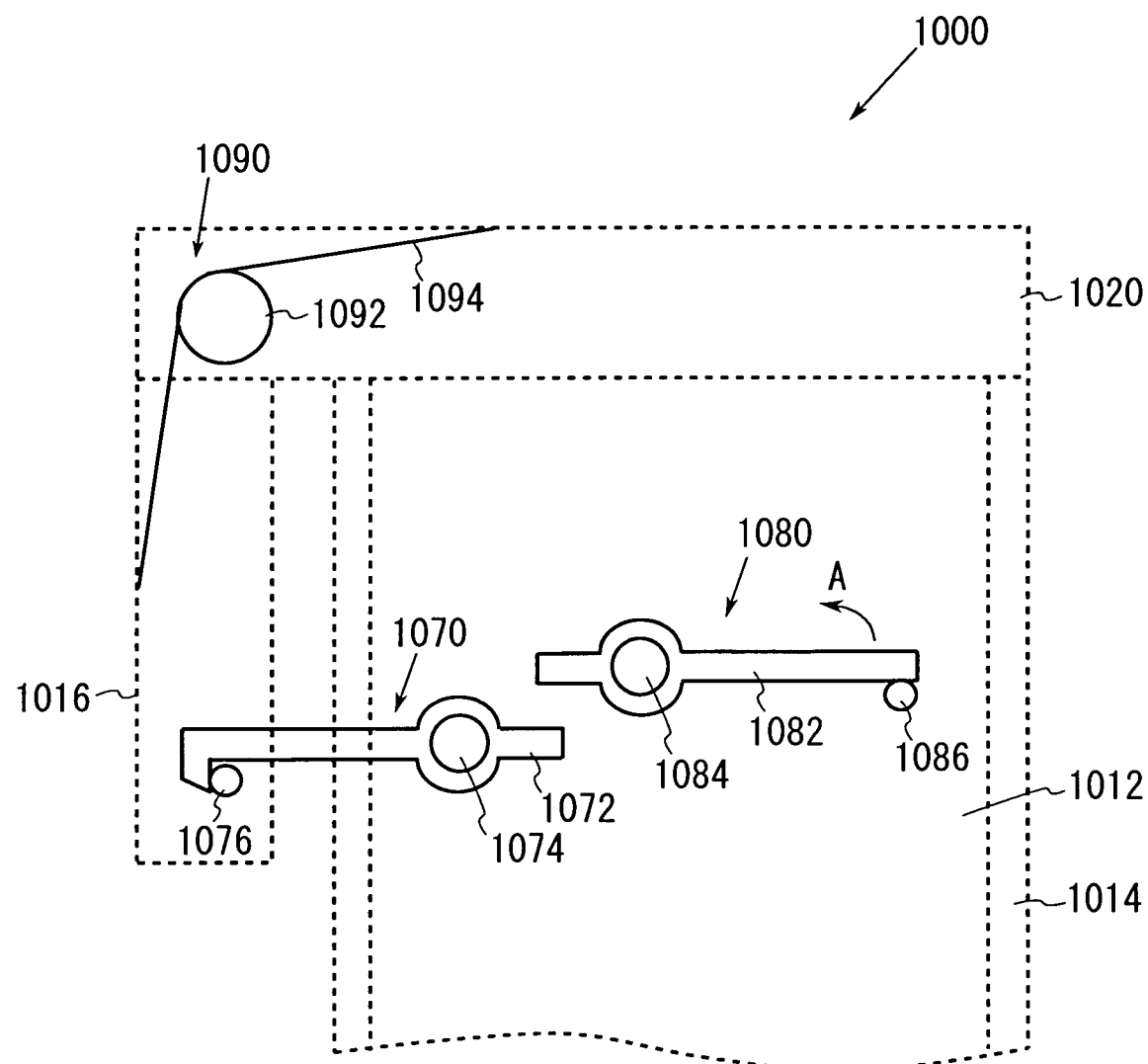
FIG. 30 shows an example of an internal structure of the image capturing apparatus 1000.

FIG. 30 shows an example of the internal configuration of the image capturing apparatus 1000. The image capturing apparatus 1000 includes a lock mechanism 1070, a lock-release mechanism 1080 and a monitor-raising mechanism 1090. The lock mechanism 1070 has a lock function of locking the image monitor unit 1016 to the predetermined position with respect to the case 1014 or the camera body 1012 in order to prevent the image monitor unit 1016 from coming apart from the case 1014 when the camera body 1012 is at the accommodation position of the case 1014. The lock-release mechanism 1080 can release the lock of the image monitor unit 1016 by the lock mechanism 1070 when the camera body 1012 is drawn from the case 1014. The monitor-raising mechanism 1090 has a function of raising the image monitor unit 1016 when the lock of the image monitor unit 1016 by the lock mechanism 1070 is released. More specifically, the monitor-raising mechanism 1090 serves as a rotation mechanism for rotating the image monitor unit 1016 from the predetermined position in such a direction that the image monitor unit 1016 comes apart from the case 1014.

In this example, the lock mechanism 1070 is provided on the camera body 1012 and includes a lock member 1072 rotatably supported by a pin 1074 and a stopper 1076 that is to be engaged with an end of the lock member 1072. The lock member 1072 is supported outside or inside the camera body 1012. The stopper 1076 is provided on the image monitor unit 1016. In another example, the lock member 1072 may be provided on the image monitor unit 1016 while the stopper 1076 may be provided outside or inside the camera body 1012. At the end of the lock member 1072 is provided an engagement portion to be engaged with the stopper 1076. The image monitor unit 1016 can be locked to the predetermined position with respect to the case 1014 or the camera body 1012 by the engagement of the lock member 1072 with the stopper 1076.

The lock-release mechanism 1080 includes a lock-release member 1082 supported by a pin 1084 in a rotatable manner and a rotation-limiter 1086 that limits the direction of the rotation of the lock-release member 1082. The lock-release mechanism 1080 is provided on the case 1014. At the state shown in FIG. 30, the lock-release member 1082 can rotate in a direction A whereas it cannot rotate in an opposite direction to the direction A. When the camera body 1012 is drawn from the case 1014, an end of the lock-release member 1082 presses an end of the lock member 1072 down, thereby releasing the lock between the lock member 1072 and the stopper 1076.

The monitor-raising mechanism 1090 includes a spring member 1094 tensioned to the rotation axis 1092 provided at the upper portion of the camera body 1092. In the arrangement shown in FIG. 30, the rotation axis 1092 is provided at an end of the upper lid 1020. An end of the spring member 1094 is connected to the upper lid 1020 while the other end thereof is connected to the image monitor unit 1016. The image monitor unit 1016 is forced to rotate around the rotation axis 1092 so as to come apart from the case 1014 by the force generated by the spring member 1094. Therefore, when the lock between the lock member 1072 and the stopper 1076 is released, the image monitor unit 1016 is made open from the closing state by the force generated by the spring member 1094.

Figure 31A:
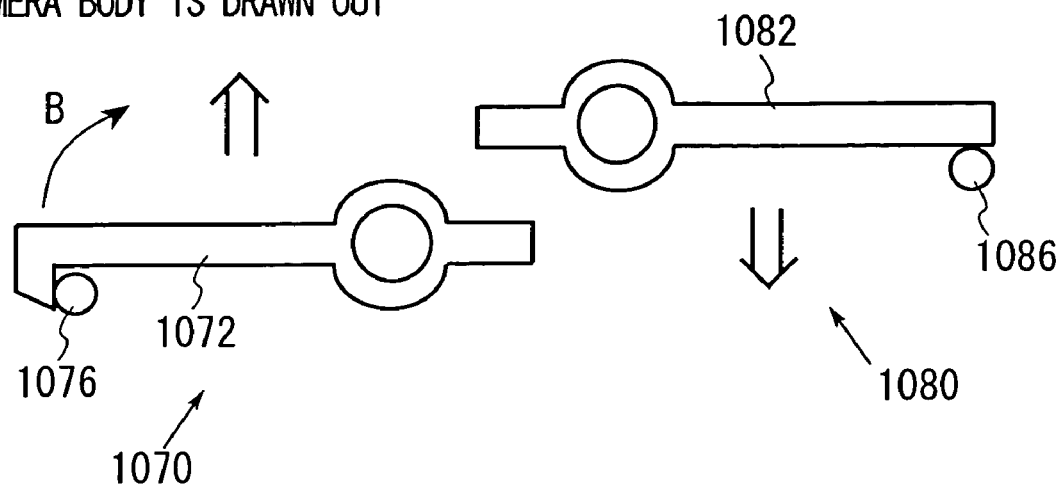
FIGS. 31A and 31B are diagrams for explaining operations of a lock mechanism 1070 and a lock-release mechanism 1080.
Figure 31B:
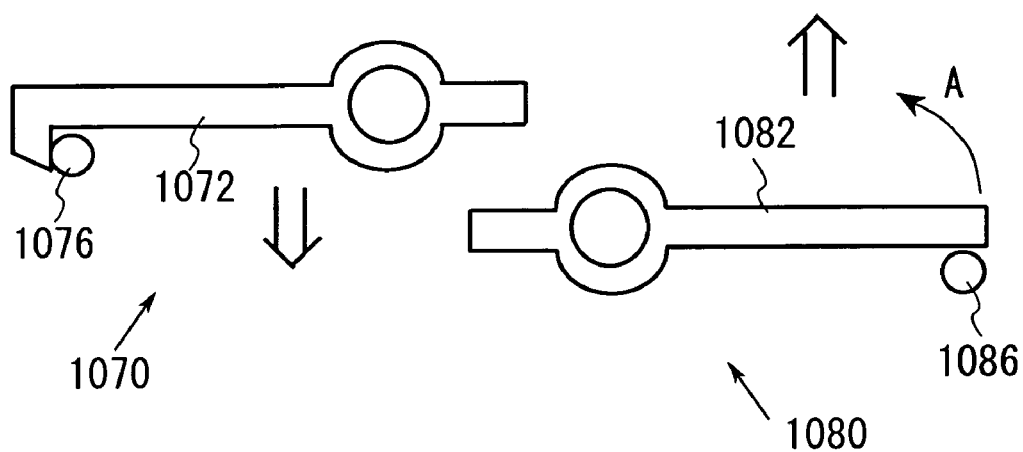

FIGS. 31A and 31B are diagrams for explaining the operations of the lock mechanism 1070 and the lock-release mechanism 1080.

FIG. 31A shows the operations of the lock mechanism 1070 and the lock-release mechanism 1080 in a case of drawing the camera body 1012 from the state where the camera body 1012 is accommodated in the case 1014. When the camera body 1012 is drawn from the case 1014, the lock mechanism 1070 supported by the camera body 1012 relatively goes up with respect to the lock-release mechanism 1080, resulting in contact between the end of the lock member 1072 and the end of the lock-release member 1082.

The lock-release member 1082 cannot rotate since the rotation limiter 1086 limits the direction of the rotation of the lock-release member 1082. Therefore, the lock-release member 1082 presses the end of the lock member 1072 down, thereby rotating the lock member 1072 in a direction indicated by Arrow B. In this way, the lock-release member 1082 releases the lock provided by the lock member 1072 and the stopper 1076.

FIG. 31B shows the operations of the lock mechanism 1070 and the lock-release mechanism 1080 in a case of accommodating the camera body 1012 into the case 1014 from the drawn state. In this case, the lock mechanism 1070 supported by the camera body 1012 relatively goes down with respect to the lock-release mechanism 1080. As a result, the end of the lock member 1072 is brought into contact with the end of the lock-release member 1082.

The lock-release member 1082 can freely rotate in the direction A. Thus, even when the end of the lock member 1072 is brought into contact with the end of the lock-release member 1082, the lock provided by the lock member 1072 and the stopper 1076 is not released. Even if the lock provided by the lock member 1072 and the stopper 1076 has been released in advance, the lock-release member 1082 has no effect on the lock member 1070.

Figure 32:
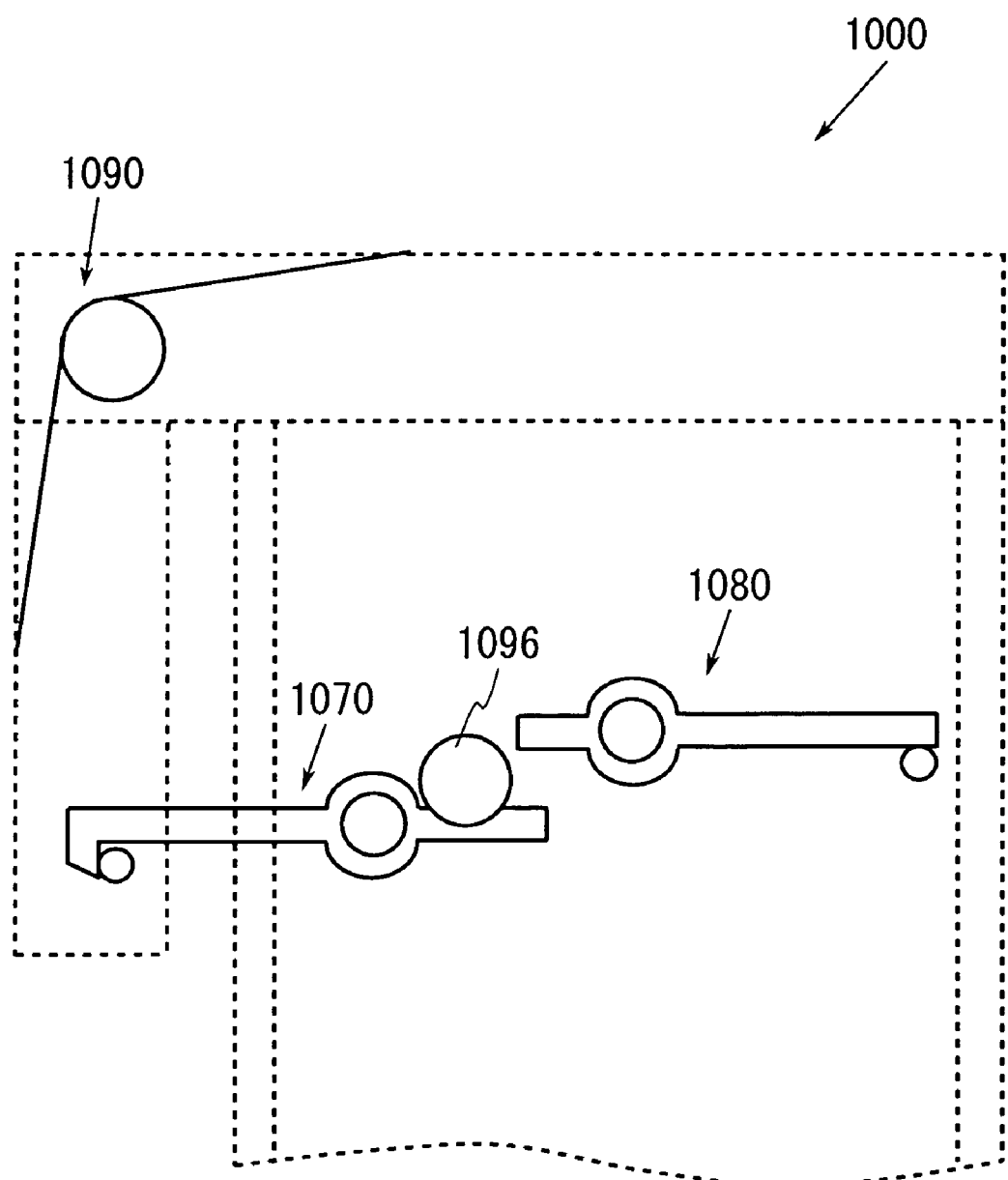
FIG. 32 shows another example of the internal structure of the image capturing apparatus 1000.

FIG. 32 shows another example of the internal configuration of the image capturing apparatus 1000 according to the present embodiment. The image capturing apparatus 1000 includes the lock mechanism 1070, the lock-release mechanism 1080, the monitor-raising mechanism 1090 and a lock-release button 1096. In FIG. 32, the components having the same reference numerals as those in FIGS. 30, 31A and 31B can have the same or similar functions as/to the corresponding components in FIGS. 30, 31A and 31B and can operate in the same or similar manner. The lock-release button 1096 is a button that the operator can press by hand.

Figure 33:
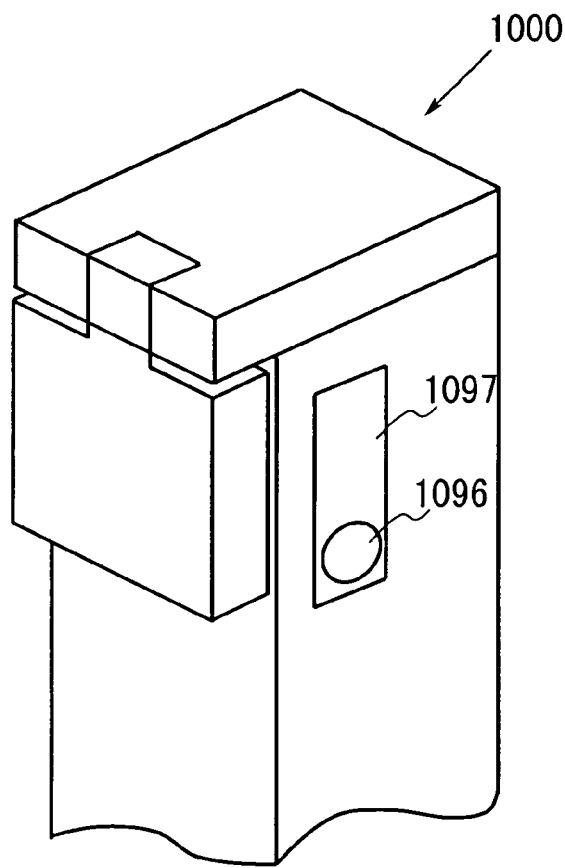
FIG. 33 is a perspective view of the image capturing apparatus 1000 having a lock-release button 1096.

FIG. 33 is a perspective view of the image capturing apparatus 1000 having the lock-release button 1096. The lock-release button 1096 is provided on the camera body 1012. On the case 1014 is provided a groove 1097 for the lock-release button 1096. By using the groove 1097, the camera body 1012 can slide with respect to the case 1014 between the first and second positions.

Figure 34:
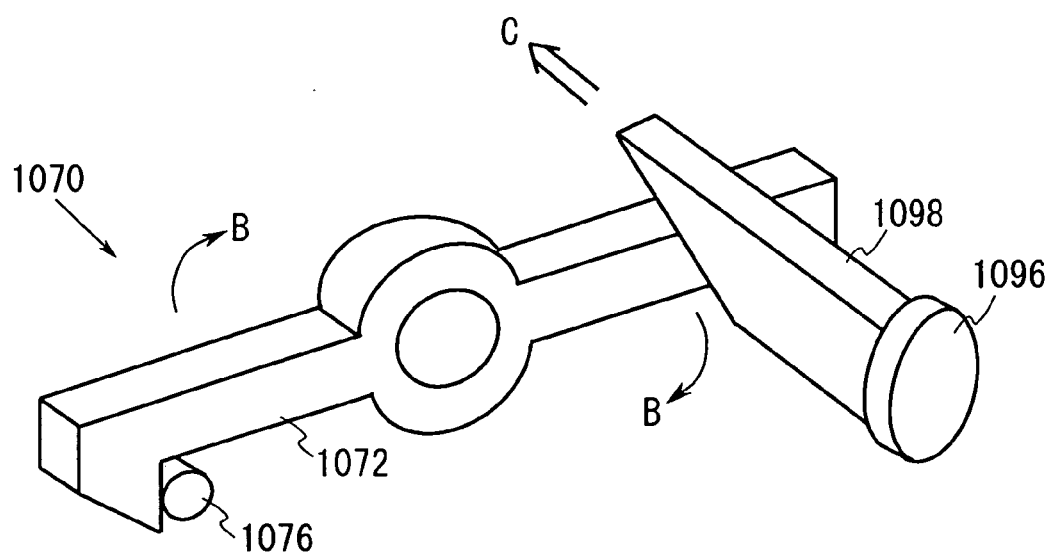
FIG. 34 shows an arrangement of the lock-release button 1096 for the lock mechanism 1070.

FIG. 34 is a diagram showing a structure of the lock-release button 1096 for the lock mechanism 1070. To the lock-release button 1096 is attached a push-down member 1098 for pushing the lock member 1072 down. The lock-release button 1096 and the push-down member 1098 are provided so as to move only in a direction C. The push-down member 1098 is formed to have an angled end face that is to be in contact with the lock member 1072.

When the operator pushes the lock-release button 1096, the end face of the push-down member 1098 is brought into contact with the lock member 1072. Since the end face has a sloped side, as shown in FIG. 34, the lock member 1072 is moved along the end face of the push-down member 1098. As a result, the lock member 1072 rotates in the direction B, thereby releasing the lock by the lock member 1072 and the stopper 1076. In this way, the operator can freely release the lock between the lock member 1072 and the stopper 1076 by pushing the lock-release button 1096.

Figure 35:
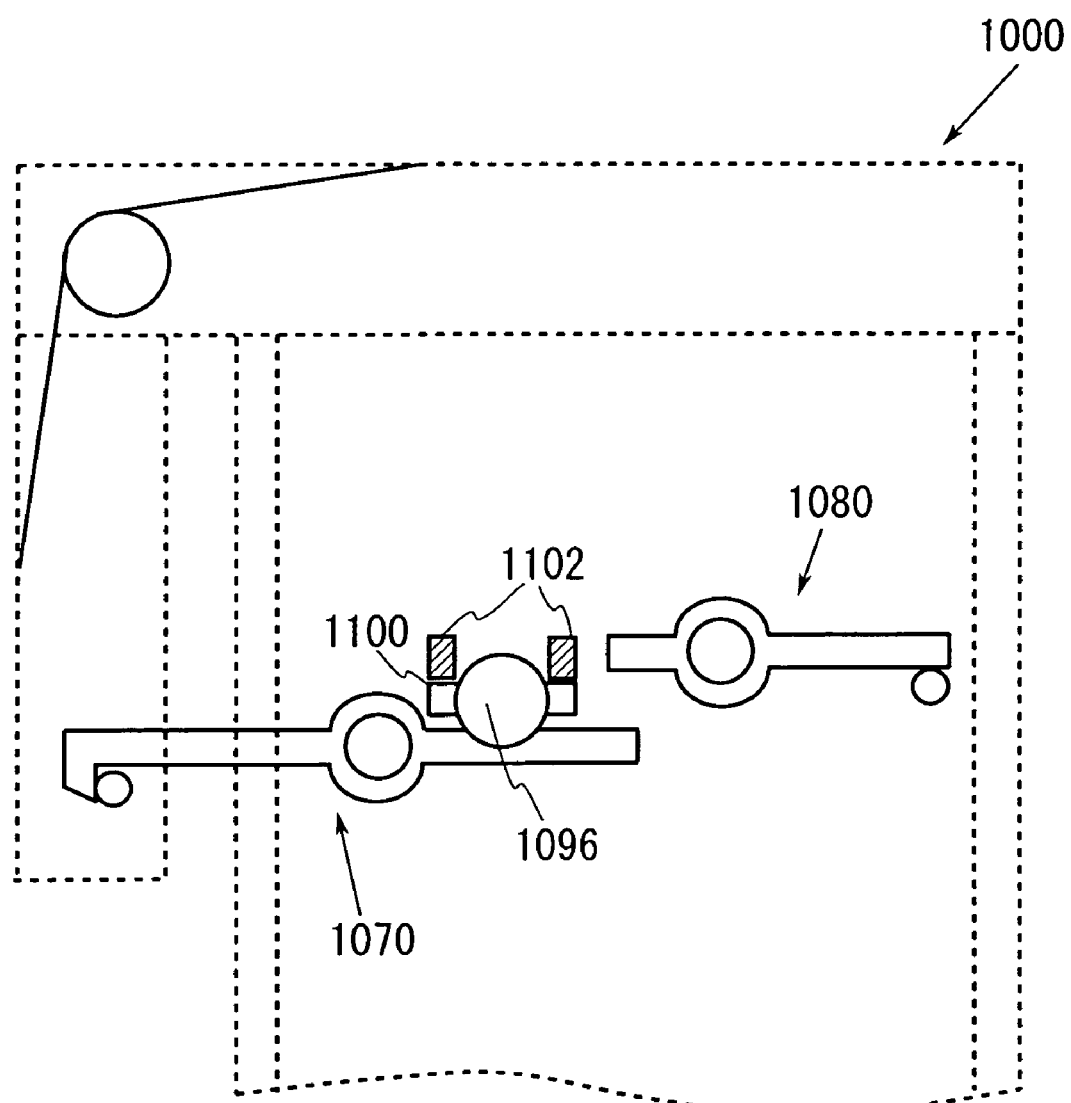
FIG. 35 shows still another example of the internal structure of the image capturing apparatus 1000 that includes the lock-release button 1096 having a function of preventing the movement of the camera body 1012 with respect to the case 1014.

FIG. 35 is a diagram showing an example of the internal structure of the image capturing apparatus 1000 including a lock mechanism having a function of preventing the camera body 1012 from moving with respect to the case 1014. The lock-release button 1096 has a lock-release function of releasing the lock for the camera body. In FIG. 35, the components having the same reference numerals as those in FIGS. 30 through 34B can have the same or similar functions as/to the corresponding components in FIGS. 30 through 34B and can operate in the same or similar manner.

The lock-release button 1096 is provided with an extendable member 1100 that can extend in the lateral direction. The case 1014 includes projections 1102 that are in contact with the extendable member 1100 and prevent the movement of the camera body 1012. When the camera body 1012 is accommodated, the lock-release button 1096 is forced toward a direction from the camera body 1012 to the case 1014. At this state, the extendable member 1100 and the projections 1102 serve as the lock mechanism that locks the camera body 1012 to the accommodation position of the case 1014. At another state where the lock-release button 1096 is not pushed by the operator, since the projections 1102 are positioned above the extendable member 1100, the camera body 1012 remains locked to the case 1014. Thus, the camera body 1012 cannot be drawn out from the case 1014.

In order to enable the camera body 1012 to be drawn from the case 1014, a lock-release mechanism for releasing the lock by the lock mechanism for the camera body 1012 is provided. The lock-release mechanism is a mechanism for allowing the lock-release button 1096 only in one direction so as to release the contact between the extendable member 1100 and the projections 1102.

Figure 36A:
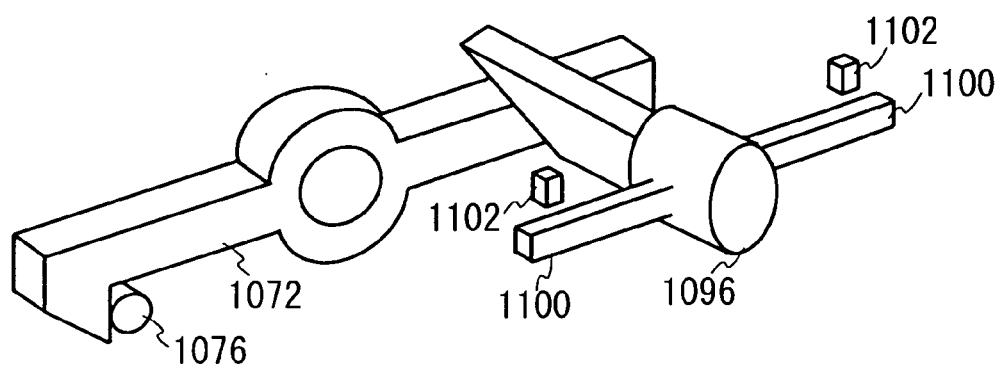
FIGS. 36A, 36B and 36C are diagrams for explaining a positional relationship between an extendable member 1100 and projections 1102.
Figure 36B:
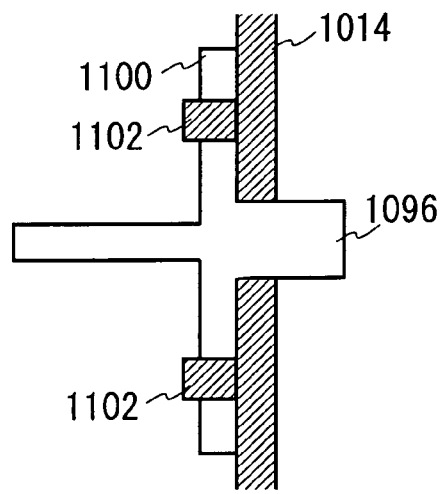
Figure 36C:
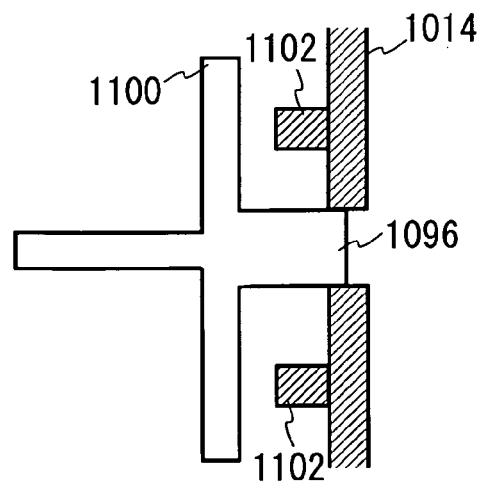

FIGS. 36A, 36B and 36C are diagrams for explaining a positional relationship between the extendable member 1100 and the projections 1102.

FIG. 36A shows the structure of the extendable member 1100 provided on the lock-release button 1096 and the projection 1102 provided on the case 1014. When the camera body 1012 is accommodated in the case 1014, the projection 1102 provided on the case 1014 is positioned above the lock-release button 1096.

FIG. 36B shows the relationship between the extendable member 1100 and the projections 1102 seen from the upper face of the image capturing apparatus 1000 when the camera body 1012 is accommodated. When the operator tries to draw the camera body 1012 from the case 1014 at this state, the extendable member 1100 is blocked by the projections 1102, thereby stopping the camera body 1012 being drawn from that position.

FIG. 36C shows the relationship between the extendable member 1100 and the projections 1102 when the lock-release button 1096 is pushed by the operator. When the operator draws the camera body 1012 from the case 1014, the extendable member 1100 cannot be blocked by the projections 1102. In this way, the operator can release the lock of the camera body 1012 to the case 1014 by pushing the lock-release button 1096, so that the operator can draw the camera body 1012.

Although the projections 1102 are provided in the case 1014 in the arrangement shown in FIGS. 36A through 36C, a hole having a shape into which the extendable member 1100 is plunged may be formed in another example. When the camera body 1012 is accommodated, the camera body 1012 is locked to the case 1014 by plunging the extendable member 1100 into the hole formed within the case 1014.

Figure 37:
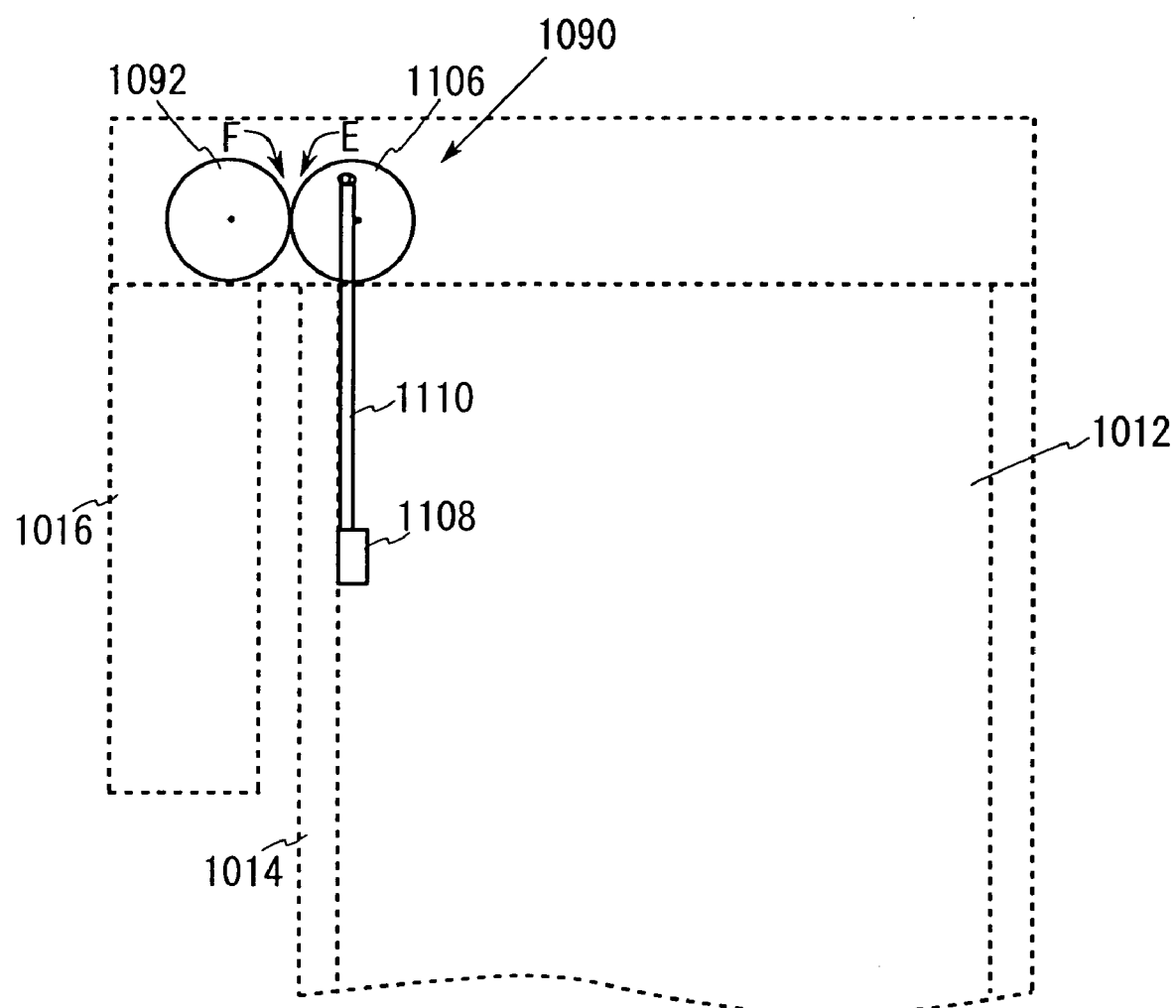
FIG. 37 shows still another example of the internal structure of the image capturing apparatus 1000 including a monitor-raising mechanism 1090.

FIG. 37 shows an example of the internal configuration of the image capturing apparatus 1000 having the monitor-raising mechanism 1090. The monitor-raising mechanism 1090 includes a rotation member 1106, a rod member 1110 and a support 1108. The rotation member 1106 is brought into contact with the rotation axis 1092 so as to make the rotation axis 1092 rotate. The rotation member 1106 is provided on the camera body 1012. The support 1108 is provided on the case 1014. An end of the rod member 1100 is connected to a portion different from the center of the rotation of the rotation member 1106 while the other end thereof is connected to the support 1108.

When the camera body 1012 is being drawn from the case 1014, the rotation member 1106 rotates in a direction E. Thus, the rotation axis 1092 that is in contact with the rotation member 1106 is rotated in a direction F. In this way, the rotation of the rotation member 1106 makes the rotation axis 1092 rotate, thereby the image monitor unit 1016 is raised. The monitor-raising mechanism 1090 may further include a clutch mechanism. Moreover, the rotation axis 1092 may be prevented from rotating when the camera body 1012 is accommodated in the case 1014.

Figure 38:
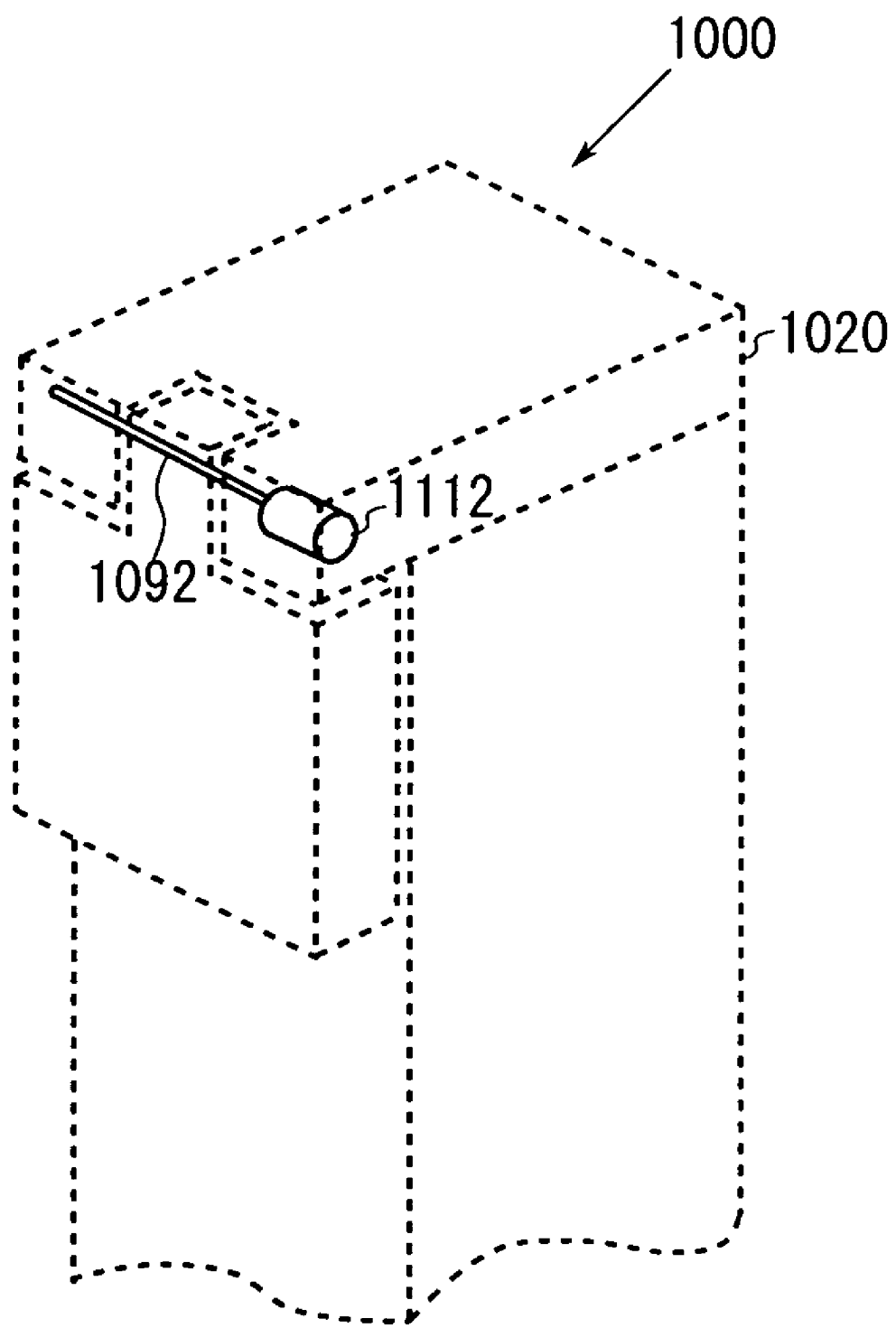
FIG. 38 shows the image capturing apparatus 1000 having a motor 1112.

FIG. 38 shows the image capturing apparatus 1100 including a motor 1112. The motor 1112 is provided on the upper lid 1020 and is connected at an end to the rotation axis 1092. For example, the motor 1112 may be actuated by a switch that is to be operated by the operator or be actuated when the camera body 1012 is drawn from the case 1014. The motor 1012 may rotate in accordance with the detection result of the detector 1060.

In the present application, the term "capturing apparatus" includes a digital camera and a digital video camera, and further includes all apparatuses having a capturing lens that can capture an image of the subject.

As is apparent from the above description, according to the present invention, a vertical capturing apparatus, especially an image capturing apparatus in which a camera body is covered with a case when being accommodated, can be provided. Moreover, according to the present invention, an image capturing apparatus that can be easily operated by an operator can be provided.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image capturing apparatus for capturing a subject comprising:
   a vertical body including a front face and a back opposed to the front face;
   a grip to be grasped by an operator's hand, said grip comprising at least a region of the front face and a region of the back;
   a release switch provided on the front face of said body in a region other than the part of said grip;
   a capturing lens provided on the back of said body in a region other than the part of said grip;
   an image monitor operable to display the subject, said image monitor being provided above said release switch, and
   a plurality of operation switches relating to the image capturing disposed in a vicinity of said release switch and on said front face of said vertical body and said plurality of operation switches not being diposed in said grip, and
   said release switch is positioned substantially at the center in the longitudinal direction of said vertical body and said operation switches are disposed within an area entirely above said release switch.

2. An image capturing apparatus according to claim 1, wherein said image monitor is provided on substantially the same plane as a plane on which said release switch is provided.

3. An image capturing apparatus according to claim 1, wherein said plurality of operation switches is disposed at an upper half-region of the vertical body.

4. An image capturing apparatus according to claim 1, wherein said image monitor is disposed farther from said grip than said plurality of operation switches.

5. An image capturing apparatus according to claim 1, said plurality of operation switches is disposed within an area to which a user's thumb is reachable when the user grasps said grip.

6. An image capturing apparatus according to claim 1, wherein said lens is disposed at a center in a direction perpendicular to a longitudinal direction of said vertical body.

7. An image capturing apparatus according to claim 1, wherein said release switch performs an image capture.

8. An image capturing apparatus according to claim 1, wherein said vertical body being formed integrally.

9. An image capturing apparatus for capturing a subject comprising:

- a vertical body including a front face and a back opposed to the front face;
- a grip to be grasped by an operator's hand, said grip comprising at least a region of the front face and a region of the back;
- a release switch provided on the front face of said body in a region other than the part of said grip;
- a capturing lens provided on the back of said body in a region other than the part of said grip;
- an image monitor operable to display the subject, said image monitor being provided above said release switch, and
- a plurality of operation switches relating to the image capturing disposed in a vicinity of said release switch and on said front face of said vertical body, and said release switch is positioned substantially at the center in the longitudinal direction of said vertical body and said operation switches are disposed within an area entirely above said release switch , said vertical body being formed integrally.

* * * * *